US008928986B2

(12) United States Patent
Fukumoto

(10) Patent No.: US 8,928,986 B2
(45) Date of Patent: Jan. 6, 2015

(54) OCULAR LENS, OCULAR LENS WITH ADDITIONAL LENS, AND OPTICAL DEVICE

(75) Inventor: Satoshi Fukumoto, Yokohama (JP)

(73) Assignee: Nikon Vision Co., Ltd., Tokyo (JP)

( * ) Notice: Subject to any disclaimer, the term of this patent is extended or adjusted under 35 U.S.C. 154(b) by 28 days.

(21) Appl. No.: 13/988,109

(22) PCT Filed: Sep. 30, 2011

(86) PCT No.: PCT/JP2011/072509
§ 371 (c)(1),
(2), (4) Date: Aug. 2, 2013

(87) PCT Pub. No.: WO2012/066856
PCT Pub. Date: May 24, 2012

(65) Prior Publication Data
US 2013/0308208 A1  Nov. 21, 2013

(30) Foreign Application Priority Data
Nov. 17, 2010  (JP) ................................ 2010-256502

(51) Int. Cl.
*G02B 3/00* (2006.01)
*G02B 3/12* (2006.01)
*G02B 9/12* (2006.01)
*G02B 25/00* (2006.01)
*G02B 9/34* (2006.01)

(52) U.S. Cl.
CPC .. *G02B 9/12* (2013.01); *G02B 3/12* (2013.01); *G02B 3/00* (2013.01); *G02B 25/001* (2013.01); *G02B 9/34* (2013.01)
USPC ........................................ 359/646; 359/643

(58) Field of Classification Search
CPC .......... G02B 25/001; G02B 3/00; G02B 3/04; G02B 9/12; G02B 9/34
USPC ........................ 359/643, 645, 646, 771, 784
See application file for complete search history.

(56) References Cited

U.S. PATENT DOCUMENTS

| 5,255,121 | A | 10/1993 | Suzuki |
| 6,577,449 | B1 | 6/2003 | Kanai |
| 8,503,089 | B2* | 8/2013 | Fukumoto ..................... 359/643 |

FOREIGN PATENT DOCUMENTS

EP    2562580 A1    2/2013
(Continued)

OTHER PUBLICATIONS

International Preliminary Report on Patentability from International Application No. PCT/JP2011/072509, May 21, 2013.
(Continued)

*Primary Examiner* — David N Spector
(74) *Attorney, Agent, or Firm* — Miles & Stockbridge P.C.

(57) ABSTRACT

The invention provides an ocular lens well corrected for aberrations through a sufficiently large angle of view and having a sufficient eye relief while ensuring avoidance of increasing the overall length and suppression of an increase in lens diameter, and provides an optical device including this ocular lens.

An ocular lens 3 includes, in order from an object side, a first lens group G1 including a first lens component G1A in meniscus form having a convex surface facing the object side, a second lens group G2 including a lens component L21 having a convex surface facing a viewing eye side, and a third lens group G3 having a positive refractive power. An object-side focal plane I of the third lens group G3 is positioned between the second lens group G2 and the third lens group G3. When f represents the focal length of the entire system; and f12 represents the combined focal length of the first lens group G1 and the second lens group G2, a condition shown by the following expression:

6≤|f12|/f is satisfied.

18 Claims, 14 Drawing Sheets

(56) References Cited

FOREIGN PATENT DOCUMENTS

| | | |
|---|---|---|
| JP | 05-119273 A | 5/1993 |
| JP | 06-175047 A | 6/1994 |
| JP | 2000-214384 A | 8/2000 |
| JP | 2003-121760 A | 4/2003 |

OTHER PUBLICATIONS

Extended European search report issued Jul. 18, 2014, in European Patent Application No. 11840955.6.
Office Action (Notice of Reasons for Rejection) issued Jul. 9, 2014, in Japanese Patent Application No. 2010-256502.

* cited by examiner

FIG. 4
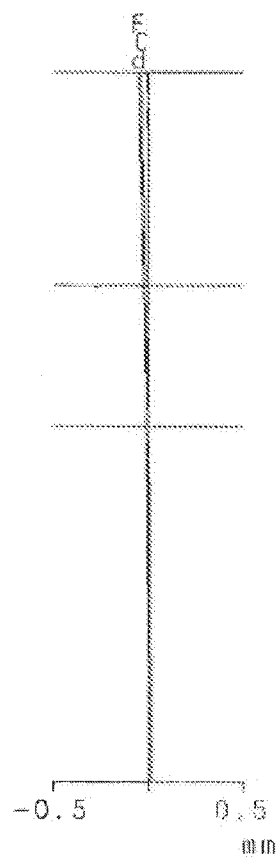
SPHERICAL ABERRATION
FN 6
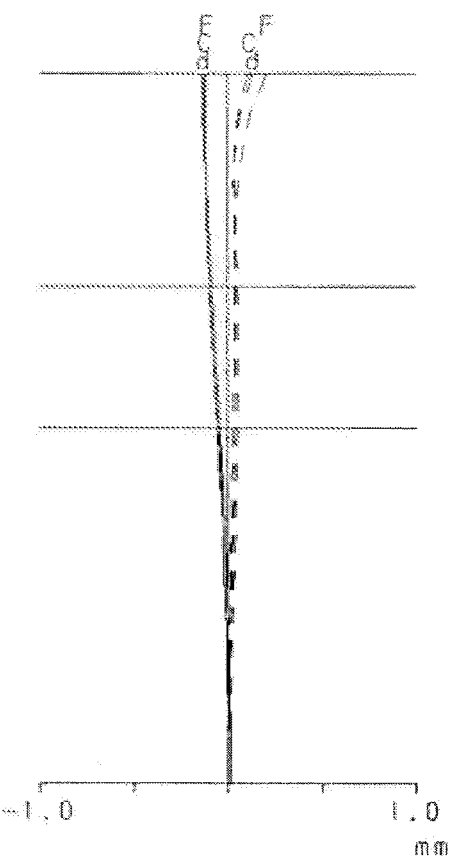
ASTIGMATISM
ω 41°

OCULAR LENS, OCULAR LENS WITH ADDITIONAL LENS, AND OPTICAL DEVICE

TECHNICAL FIELD

The present invention relates to an ocular lens, an ocular lens with an additional lens, and an optical device.

BACKGROUND ART

For example, in an optical device such as a telescope, a binocular or a microscope, an ocular lens is used to further enlarge and view a real image formed by an objective lens. It is demanded that such an ocular lens have a sufficient eye relief (the on-axis spacing between the outermost lens surface of the ocular lens on the viewing eye side and the eye point (the position of the viewing eye) for comfortable viewing, as well as that the lens be well corrected for aberrations through a large angle of view. However, it is well known that, in ordinary cases, when the apparent field of view of an ocular lens is increased, it becomes difficult to secure a sufficiently long eye relief, and aberrations of a luminous flux at the periphery of the field of view, particularly field curvature aberration and astigmatism worsen abruptly.

For example, an ocular lens constructed by disposing a negative lens group and a positive lens group on the object side and the viewing eye side, respectively, and by providing a field stop between the negative and positive lens groups has been disclosed (see, for example, Patent Literature 1). In the ocular lens having the construction disclosed in Patent Literature 1, the negative lens group is disposed on the object side to secure a large eye relief. Also, the provision of the negative lens group having a high refractive power enables reducing the Petzval sum; a condition for suitably correcting field curvature aberration is provided. This type of ocular lens is capable of making the Petzval sum smaller and is more advantageous in correcting aberrations including field curvature aberration if the ratio of the focal length of the negative lens group on the object side and the focal length of the positive lens group on the viewing eye side is closer to 1:1.

CITATION LIST

Patent Literature

[Patent Literature 1] Japanese Patent Laid-Open No. 6-175047

SUMMARY OF INVENTION

Technical Problem

However, providing an apparent field of view of 80 degrees or more while ensuring a sufficient eye relief requires increasing the focal length of the positive lens group on the viewing eye side to a certain extent. It is preferable that the focal length of the positive lens group in the case of doing so be 25 mm or more. Also, it is possible to suppress worsening of aberrations by making the focal length of the negative lens component on the object side of the first lens group approximately several times (not larger than about four times) in absolute value the focal length of the positive lens component on the viewing eye side in order to produce an advantageous effect of the focal length of the negative lens component on the object side of the first lens group on aberrations including field curvature aberration. This method, however, allows the positive lens component on the viewing eye side to be increased in diameter by the divergence effect of the negative lens component on the object side, so that the compactness is lost. Also, the corrections of aberrations at the periphery of the visual field made by this method cannot be said to be adequate, and only an apparent field of view of at most about 60 degrees can be ensured. This tendency is noticeable when the focal length of the entire ocular lens is large.

The present invention has been achieved in consideration of these problems, and an object of the present invention is to provide an ocular lens and an ocular lens with an additional lens well corrected for aberrations through a sufficiently large angle of view and having a sufficient eye relief while ensuring avoidance of increasing the overall length and suppression of an increase in lens diameter, and an optical device including the ocular lens or the ocular lens with an additional lens.

Solution to Problem

To solve the above-described problems, according to the present invention, there is provided an ocular lens including, in order from an object side, a first lens group including a first lens component in meniscus form having a convex surface facing the object side, a second lens group including a lens component having a convex surface facing a viewing eye side, and a third lens group having a positive refractive power, wherein an object-side focal plane of the third lens group is positioned between the second lens group and the third lens group. When f represents the focal length of the entire system and f12 represents the combined focal length of the first lens group and the second lens group, a condition shown by the following expression:

$$6 \leq |f12|/f$$

is satisfied.

Preferably, in such ocular lens, when f3 represents the focal length of the third lens group, a condition shown by the following expression:

$$0.7 \leq f3/f \leq 1.5$$

is satisfied.

Preferably, in such ocular lens, when f2 represents the focal length of the second lens group, a condition shown by the following expression:

$$5 \leq |f2/f|$$

is satisfied.

Preferably, in such ocular lens, the first lens component included in the first lens group is a cemented lens formed by cementing two lenses to each other, and, when Rf represents the radius of curvature of the surface of the first lens component on the object side; d11 represents the on-axis distance of the lens on the object side; n11 represents the d-line refractive index of the medium of the lens on the object side; d12 represents the on-axis distance of the lens on the viewing eye side; and n12 represents the d-line refractive index of the medium of the lens on the viewing eye side, a condition shown by the following expression:

$$2 \leq Rf/(d11/n11 + d12/n12) \leq 5.5$$

is satisfied.

Preferably, in such ocular lens, when Rr represents the radius of curvature of the surface on the viewing eye side of the first lens component included in the first lens group, a condition shown by the following expression:

$$0.55 \leq Rr/f \leq 1.1$$

is satisfied.

Preferably, in such ocular lens, the first lens component included in the first lens group has a negative refractive power and, when f1A represents the focal length of the first lens component, a condition shown by the following expression:

$$f1A/f \leq -3$$

is satisfied.

Preferably, in such ocular lens, the first lens component included in the first lens group is a cemented lens formed by cementing two lenses to each other, and, when v11 represents the d-line Abbe number of the medium of the lens on the object side in the first lens component; and v12 represents the d-line Abbe number of the medium of the lens on the viewing eye side, a condition shown by the following expression:

$$3 \leq |v11 - v12| \leq 40$$

is satisfied.

Preferably, in such ocular lens, the first lens group include, in order from the object side, the first lens component and a second lens component.

Preferably, in such ocular lens, the second lens component included in the first lens group is a cemented lens formed by cementing two lenses to each other, and, when v21 represents the d-line Abbe number of the medium of the lens on the object side in the second lens component; and v22 represents the d-line Abbe number of the medium of the lens on the viewing eye side, a condition shown by the following expression:

$$20 \leq |v21 - v22|$$

is satisfied.

Preferably, in such ocular lens, when D represents an on-axis air space between the second lens group and the third lens group, a condition shown by the following expression:

$$0.7 \leq D/f \leq 2$$

is satisfied.

Preferably, in such ocular lens, the second lens group includes a lens component in meniscus form having a convex surface facing the viewing eye side.

Preferably, in such ocular lens, at least one of the surfaces of the lenses included in the first lens group, the second lens group and the third lens group is formed into an aspherical shape.

According to the present invention, there is also provided an ocular lens with an additional lens including any one of the ocular lenses as described above and an additional lens including, in order from an object side, a front lens group having a negative refractive power and a rear lens group having a positive refractive power, the additional lens being additionally disposed on the object side of the ocular lens to reduce the focal length of the ocular lens, wherein when Dad1 represents an on-axis air space between the front lens group and the rear lens group; Dad2 represents an on-axis air space between the viewing-eye-side outermost lens surface of the rear lens group and the object-side outermost lens surface of the ocular lens; and f represents the focal length of the ocular lens, conditions shown by the following expressions:

$$0 \leq Dad1/f \leq 1$$

$$0 \leq Dad2/f \leq 1$$

are satisfied.

Preferably, in such ocular lens with an additional lens, when fad represents the focal length of the additional lens; fad1 represents the focal length of the front lens group; and fad2 represents the focal length of the rear lens group, conditions shown by the following expressions $$10 \leq |fad/f|$$

$$0.6 \leq (-fad1)/fad2 \leq 1.3$$

are satisfied.

Preferably, in such ocular lens with an additional lens, the front lens group consists of a single lens having a concave surface facing the object side, the rear lens group consists of a single lens having a convex surface facing the viewing eye side, and, when Rfad1 represents the radius of curvature of the surface of the front lens group on the object side; Rrad1 represents the radius of curvature of the surface of the front lens group on the viewing eye side; Rfad2 represents the radius of curvature of the surface of the rear lens group on the object side; and Rrad2 represents the radius of curvature of the surface of the rear lens group on the viewing eye side, conditions shown by the following expressions $$0.2 < |Rfad1/Rrad1| \leq 1$$

$$2 < |Rfad2/Rrad2|$$

are satisfied.

Preferably, in such ocular lens with an additional lens, when vad1 represents the d-line Abbe number of the medium of the single lens constituting the front lens group; and vad2 represents the d-line Abbe number of the medium of the single lens constituting the rear lens group, conditions shown by the following expressions $$vad1 - vad2 \leq 25$$

$$50 < vad1$$

are satisfied.

Preferably, in such ocular lens with an additional lens, the additional lens can be mounted in a barrel that holds the ocular lens.

According to the present invention, there is provided an optical device including any one of the above-described ocular lens or the above-described ocular lens with an additional lens.

Advantageous Effects of Invention

The above-described arrangement according to the present invention enables providing an ocular lens and an ocular lens with an additional lens well corrected for aberrations through a sufficiently large angle of view and having a sufficient eye relief while ensuring avoidance of increasing the overall length and suppression of an increase in lens diameter, and an optical device including the ocular lens or the ocular lens with an additional lens.

BRIEF DESCRIPTION OF DRAWINGS

FIG. 4 is a diagram of aberrations in the ocular lens according to the first example.

DESCRIPTION OF EMBODIMENTS

Figure 1:
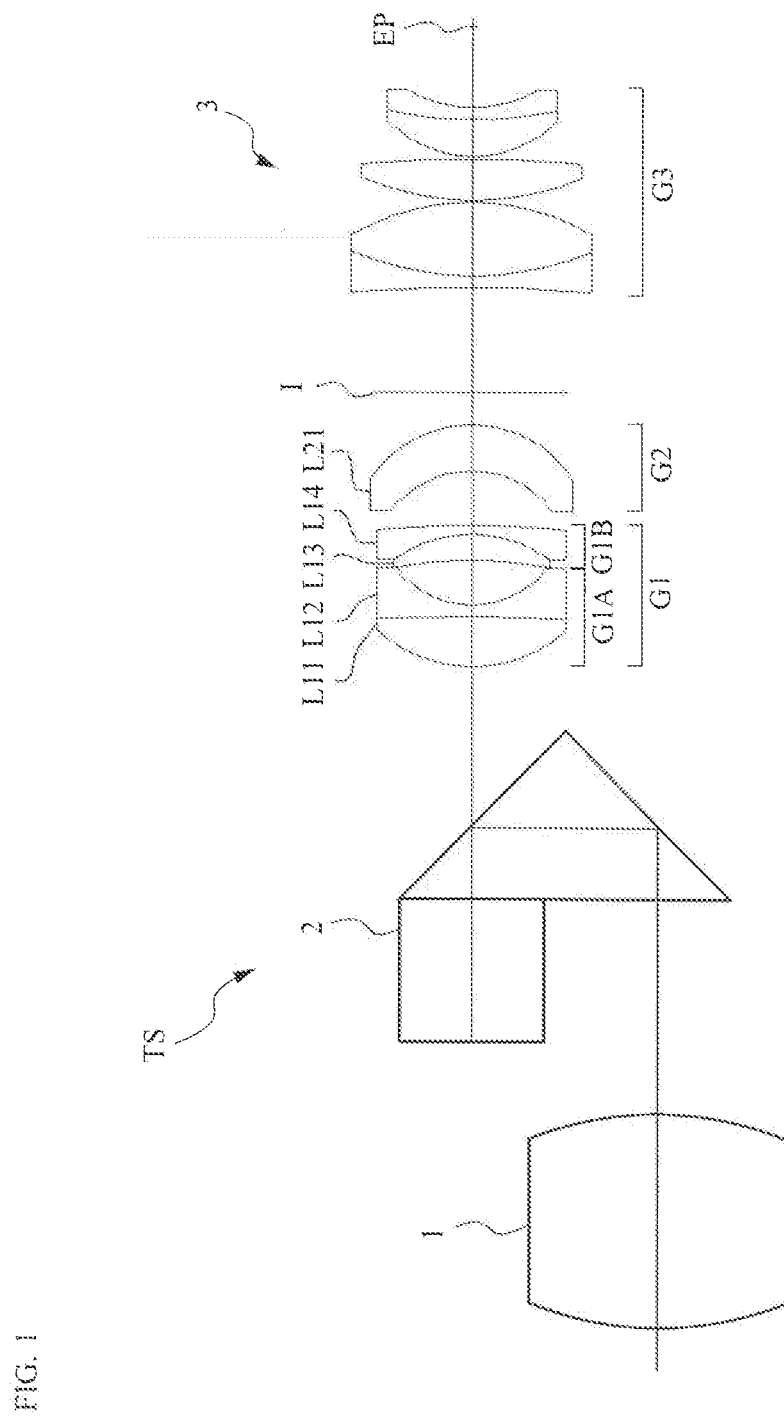
FIG. 1 is an explanatory diagram showing the construction of an optical device having an ocular lens.

A preferred embodiment of the present invention will be described below with reference to the drawings. The construction of a telescope optical system TS shown in FIG. 1 will first be described as an optical device having an ocular lens according to the present embodiment. This telescope optical system TS includes, in order from the viewed object side, an objective lens 1, an erecting prism 2 and an ocular lens 3. The erecting prism 2 is disposed between the objective lens 1 and the ocular lens 3 and causes top-bottom left-right inversion of an inverted image of a viewed object formed by the objective lens 1. As erecting prism 2, for example, a prism formed of two prisms each in isosceles triangle form, i.e., a Porro prism, may be used. An image of a viewed object formed by the objective lens 1 can be viewed in an enlarged state with a viewing eye positioned at an eye point EP by using the ocular lens 3. The telescope optical system TS shown in FIG. 1 is only an example. The present invention is not limited to the arrangement shown in FIG. 1. For example, an arrangement without the erecting prism 2 may suffice for an astronomical telescope or the like since there is no need for the erecting prism 2 therein.

The ocular lens 3 according to the present embodiment includes, in order from an object side, a first lens group G1 having a first lens component G1A in meniscus form having a convex surface facing the object side, and a second lens group G2 having a lens component L21 having a convex surface facing a viewing eye side, and a third lens group G3 having a positive refractive power. In the ocular lens 3, an object-side focal plane I of the third lens group G3 is positioned between the second lens group G2 and the third lens group G3.

It is desirable that, in such ocular lens 3 according to the present embodiment, when f represents the focal length of the entire system and f12 represents the combined focal length of the first lens group G1 and the second lens group G2, the following condition expression (1) be satisfied.

$$6 \le |f12|/f \tag{1}$$

Condition expression (1) specifies the ratio of the combined focal length f12 of the first lens group G1 and the second lens group G2 and the focal length f of the entire ocular lens 3. In the case of falling beyond the lower limit of condition expression (1) when the refractive power of the combination of the first lens group G1 and the second lens group G2 is positive, that is, the combined focal length f12 is positive, the positive refractive power of the combination is increased and the Petzval sum is increased, so that field curvature aberration and astigmatism cannot be adequately corrected. In the case of falling beyond the lower limit of condition expression (1) when the refractive power of the combination of the first lens group G1 and the second lens group G2 is negative, that is, the combined focal length f12 is negative, the negative refractive power of the combination is increased, so that the divergence effect of the first and second lens groups G1 and G2 is excessively strong and an increase in diameter of the third lens group G3 results. Therefore falling beyond the lower limit is undesirable. It is desirable to set the lower limit of condition expression (1) to 7.3 in order to ensure the effects of the present embodiment. It is desirable to set the lower limit of condition expression (1) to 8.3 in order better to ensure the effects of the present embodiment.

It is desirable that, in the ocular lens 3 according to the present embodiment, when f represents the focal length of the entire system and f3 represents the focal length of the third lens group G3, the following condition expression (2) be satisfied.

$$0.7 \le f3/f \le 1.5 \tag{2}$$

Condition expression (2) specifies the focal length f3 of the third lens group G3. In ordinary cases, the eye relief of an ocular lens depends largely on the focal length of a positive lens component disposed on the viewing eye side relative to a field stop. Securing a sufficiently long eye relief while correcting aberrations at the periphery of the visual field at an apparent field of view of 80 degrees or more requires setting the focal length of a positive lens component on the viewing eye side to about twice the eye relief. This is because making an adequate aberration correction through a large angle of view requires at least about five lenses, and because, as a result of increasing the lens diameter for increase of the field of view, the center thicknesses of the lenses become so large that the difficulty in providing the desired eye relief is increased in comparison with the case of an ocular lens having an ordinary apparent field of view of about 50 to 60 degrees.

In the case of falling beyond the lower limit of condition expression (2), a sufficient eye relief cannot be secured. Therefore falling beyond the lower limit is undesirable. It is desirable to set the lower limit of condition expression (2) to 0.8 in order to ensure the effects of the present embodiment. It is also desirable to set the lower limit of condition expression (2) to 0.9 in order better to ensure the effects of the present embodiment. In the case of exceeding the upper limit of condition expression (2), an increase in lens diameter of the third lens group G3 results. Therefore exceeding the upper limit is undesirable. It is desirable to set the upper limit of condition expression (2) to 1.4 in order to ensure the effects of the present embodiment. It is also desirable to set the upper limit of condition expression (2) to 1.35 in order better to ensure the effects of the present embodiment.

It is desirable that, in the ocular lens 3 according to the present embodiment, when f2 represents the focal length of the second lens group G2 and f represents the focal length of the entire system, the following condition expression (3) be satisfied.

$$5 \le |f2/f| \tag{3}$$

Condition expression (3) specifies the ratio of the focal length f2 of the second lens group G2 and the focal length f of the entire system of ocular lens 3. By satisfying condition expression (3), the ocular lens 3 in the present embodiment has the effect of suppressing an increase in lens diameter of the third lens group G3 and the effect of reducing the Petzval sum.

The specification of the focal length f2 of the second lens group G2 will be now described. One of the objectives in designing the ocular lens 3 according to the present embodiment is to secure a large apparent field of view while avoiding increasing the lens diameter, particularly the lens diameter of the third lens group G3. If the second lens group G2 is provided as a lens component having a positive focal length, a luminous flux diverged by the first lens group G1 can be refracted toward the optical axis direction, thus enabling lowering the position of a luminous flux entering the third lens group G3 to attain this objective.

However, since the second lens group G2 has a positive refractive power, there is a possibility of the Petzval sum being increased. Then the lens component constituting the second lens group G2 may be formed into such a shape that a convex surface faces the viewing eye side, preferably a meniscus form to produce an effect of reducing the Petzval sum. This is because a Galilean system having an effect of reducing the Petzval sum can be provided by forming a concave surface of a meniscus form with a negative refractive power. The effect of reducing the Petzval sum can be more improved by increasing the negative refractive power of this lens surface. Also, the positions of the principal points of the second lens group G2 can be largely shifted toward the viewing eye side by facing the convex surface toward the viewing eye side to produce an effect of limiting the length of the entire ocular lens 3.

In some case, however, it is not necessarily required that the focal length of the second lens group G2 be positive. An example of such is a case where it is not necessary to reduce the lens diameter of the third lens group G3 so greatly. In an ordinary case of viewing with the left and right eyes, such as viewing through a binocular, the human eye-to-eye distance (the distance between the left and right pupils) is an issue. The human eye-to-eye distance is ordinarily about 60 mm to 70 mm. Accordingly, an optical axis distance of 60 mm or more between left and right ocular lenses is required and there is a need for making so that the diameter of lens barrels for the ocular lenses satisfies a corresponding condition. In the case of a telescope or the like for viewing with a single eye, however, there is no need to consider the eye-to-eye distance and, therefore, the lens barrel diameter can be increased in a range with which there is no problem in practice. In some cases, therefore, the need to reduce the lens diameter of the third lens group G3 by the positive lens effect of the second lens group G2 is reduced. In such cases, if the shape of the lens component in the meniscus form is optimized while maintaining an aberration balance, the focal length of the second lens group G2 is not always positive; the second lens group G2 may be formed so as to have no refractive power or have a negative focal length.

However, when the apparent field of view is increased to 80 degrees or more, an increase in lens diameter of the third lens group G3 causes difficulty in making corrections to field curvature aberration and astigmatism at the periphery of the visual field. There is, therefore, a need to also limit the negative refractive power the range according to condition expression (3). In the ocular lens 3 according to the present embodiment, both avoidance of increasing the Petzval sum and suppression of the increase in lens diameter of the third lens group G3 can be achieved by satisfying condition expression (3).

Here, in the case of falling beyond the lower limit of condition expression (3) when the second lens group G2 has a positive refractive power, the Petzval sum is increased and aberrations including field curvature aberration cannot be adequately corrected. Therefore falling beyond the lower limit is undesirable. In the case of falling beyond the lower limit of condition expression (3) when the second lens group G2 has a negative refractive power, the divergence effect of the second lens group G2 is made stronger, the lens diameter of the third lens group G3 is increased, and it is difficult to make corrections to aberrations at the periphery of the visual field. Therefore falling beyond the lower limit is undesirable.

It is desirable to set the lower limit of condition expression (3) to 6 in order to ensure the effects of the present embodiment. It is also desirable to set the lower limit of condition expression (3) to 7 in order better to ensure the effects of the present embodiment.

It is desirable that, in the ocular lens 3 according to the present embodiment, the first lens component G1A included in the first lens group G1 be a cemented lens formed by cementing two lenses to each other. For example, referring to FIG. 1, it is formed as a cemented lens formed of a biconvex lens L11 and a biconcave lens L12 in order from the object side. It is desirable that, in the ocular lens 3, when Rf represents the radius of curvature of the surface of the first lens component G1A on the object side; d11 represents the on-axis distance of the lens L11 on the object side in the cemented lens; n11 represents the d-line refractive index of the medium of the lens L11 on the object side; d12 represents the on-axis distance of the lens L12 on the viewing eye side; and n12 represents the d-line refractive index of the medium of the lens L12 on the viewing eye side, the following condition expression (4) be satisfied.

$$2 \leq Rf/(d11/n11 + d12/n12) \leq 5.5 \quad (4)$$

It is desirable that, in the ocular lens 3 according to the present embodiment, when Rr represents the radius of curvature of the surface on the viewing eye side of the first lens component G1A included in the first lens group G1, the following condition expression (5) be satisfied.

$$0.55 \leq Rr/f \leq 1.1 \quad (5)$$

Condition expressions (4) and (5) specify the shape of the first lens component G1A included in the first lens group G1.

Lowering toward the optical axis direction of a luminous flux at the periphery of the visual field, entering the ocular lens 3, is enabled by satisfying condition expression (4). An increase in lens diameter of the subsequent lenses can be suppressed thereby. The shape lowering the luminous flux, however, has the convex surface facing the object side, has a positive refractive power, and disadvantageously acts with respect to the Petzval sum. Then, suppressing an increase in Petzval sum is enabled by satisfying condition expression (5). Condition expression (5) specifies the radius of curvature of the surface of the first lens component G1A on the viewing eye side. By satisfying condition expression (5), this surface can be made to have a negative refractive power. The first lens component G1A is formed into a meniscus form with a convex surface facing the object side by satisfying condition expression (4) and condition expression (5), thus enabling provision of a Galilean system having an effect of reducing the Petzval sum.

In the case of falling beyond the lower limit of condition expression (4), the refraction effect of the first lens component G1A is increased and worsening of aberrations at the periphery of the visual field results. Therefore falling beyond the lower limit is undesirable. It is desirable to set the lower limit of condition expression (4) to 3 in order to ensure the effects of the present embodiment. It is also desirable to set the lower limit of condition expression (4) to 3.5 in order better to ensure the effects of the present embodiment. In the case of exceeding the upper limit of condition expression (4), the effect of reducing the height of a luminous flux at the periphery of the visual field cannot be obtained by the first lens component G1A; an increase in lens diameter of the following lens results. Therefore exceeding the upper limit is undesirable. It is desirable to set the upper limit of condition expression (4) to 5 in order to ensure the effects of the present embodiment. It is also desirable to set the upper limit of condition expression (4) to 4.8 in order better to ensure the effects of the present embodiment.

In the case of falling beyond the lower limit of condition expression (5), the negative refractive power of the surface of the first lens component G1A on the viewing eye side is increased to such an extent that the divergence effect is excessively high, thereby causing worsening of aberrations with respect to a luminous flux at the periphery of the visual field and an increase in lens diameter of the subsequent lenses. Therefore falling beyond the lower limit is undesirable. It is desirable to set the lower limit of condition expression (5) to 0.62 in order to ensure the effects of the present embodiment. It is also desirable to set the lower limit of condition expression (5) to 0.68 in order better to ensure the effects of the present embodiment. Conversely, in the case of exceeding the upper limit of condition expression (5), the negative refractive power of the surface of the first lens component G1A on the viewing eye side is reduced, the effect of suppressing an increase in Petzval sum cannot be obtained, and failure to adequately correct aberrations including field curvature aberration results. It is desirable to set the upper limit of condition expression (5) to 0.9 in order to ensure the effects of the present embodiment. It is also desirable to set the upper limit of condition expression (5) to 0.82 in order better to ensure the effects of the present embodiment.

If, in the ocular lens 3 according to the present embodiment, the first lens component G1A included in the first lens group G1 has a negative refractive power, and if, when f1A represents the focal length of the first lens component G1A, the following condition expression (6) is satisfied, a more preferable ocular lens 3 can be provided.

$$f1A/f \leq -3 \qquad (6)$$

Both lowering the height of a luminous flux at the periphery and suppressing an increase in Petzval sum are enabled by satisfying condition expression (6). In the case of exceeding the upper limit of condition expression (6), an advantageous effect on the Petzval sum is obtained but the divergence effect of the first lens component G1A is made stronger, resulting in failure to suppress worsening of aberrations at the periphery of the visual field and an increase in lens diameter of the subsequent lenses. Therefore exceeding the upper limit is undesirable. It is desirable to set the upper limit of condition expression (6) to −4 in order to ensure the effects of the present embodiment. It is also desirable to set the upper limit of condition expression (6) to −5 in order better to ensure the effects of the present embodiment.

It is desirable that the ocular lens 3 according to the present embodiment has, in addition to the above-described first lens component G1A, a second lens component G1B on the image side of the first lens component G1A. It is also desirable that each of the first lens component G1A and the second lens component G1B be a cemented lens formed by cementing two lenses to each other. For example, the second lens component G1B shown in FIG. 1 is formed as a cemented lens formed of a positive meniscus lens L13 and a negative meniscus lens 114 in order from the object side.

It is desirable that, in such a case, when v11 represents the d-line Abbe number of the medium of the lens L11 on the object side in the first lens component G1A; and v12 represents the d-line Abbe number of the medium of the lens L12 on the viewing eye side, the following condition expression (7) be satisfied. It is also desirable that when v21 represents the d-line Abbe number of the medium of the lens L13 on the object side in the second lens component G1B; and v22 represents the d-line Abbe number of the medium of the lens L14 on the viewing eye side, the following condition expression (8) be satisfied.

$$3 \leq |v11 - v12| \leq 40 \qquad (7)$$

$$20 \leq |v21 - v22| \qquad (8)$$

Condition expression (7) specifies the Abbe number of the medium of each lens constituting the first lens component G1A. Good correction of chromatic aberration, particularly on-axis chromatic aberration is enabled by forming the first lens component G1A as a cemented lens and satisfying condition expression (7). Correction of chromatic aberration is important in picture taking or the like in particular, for which a correction to chromatic aberration through a wide wavelength range is preferably made. Here, if a lens group closer to the object side, in other words, a lens at a position closer to the objective lens 1 is formed as a cemented lens, control of on-axis chromatic aberration becomes easier. Also, when the visual field is widened, difficulty in correcting chromatic aberration of magnification at the periphery of the visual field is increased. Then, in the case where the second lens component G1B is also formed as a cemented lens and where condition expression (8) is satisfied, a good correction can be made to chromatic aberration of magnification at the periphery of the visual field in particular. Doing so enables dispersion of correction of chromatic aberration into the first lens component G1A and the second lens component G1B and enables simultaneously making corrections to on-axis chromatic aberration and chromatic aberration of magnification even through the widened visual field as well as suppressing the occurrence of aberrations including astigmatism and comatic aberration at the periphery of the visual field. Needless to say, a sharp image free from color blurring at a visual field center can be obtained in performance of viewing with the eye by reducing on-axis chromatic aberration.

In the case of falling beyond the lower limit of condition expression (7), on-axis chromatic aberration is not adequately corrected. Therefore falling beyond the lower limit is undesirable. Also, the radius of curvature of the cemented surface is reduced to cause worsening of aberration at the periphery of the visual field. It is desirable to set the lower limit of condition expression (7) to 5 in order to ensure the effects of the present embodiment. In the case of exceeding the upper limit of condition expression (7), on-axis chromatic aberration can be corrected but it is difficult to balance other chromatic aberrations including chromatic aberration of magnification. Therefore exceeding the upper limit is undesirable. It is desirable to set the upper limit of condition expression (7) to 35 in order to ensure the effects of the present embodiment. It is also desirable to set the upper limit of condition expression (7) to 30 in order better to ensure the effects of the present embodiment.

It is desirable to set the lower limit of condition expression (8) to 30 to ensure the effects of the present embodiment.

It is desirable that, in the ocular lens 3 according to the present embodiment, when D represents an on-axis air space between the second lens group G2 and the third lens group G3; and f represents the focal length of the entire system, the following condition expression (9) be satisfied.

$$0.7 \leq D/f \leq 2 \qquad (9)$$

Condition expression (9) specifies the on-axis air space D between the second lens group G2 and the third lens group G3. Both making good corrections to aberrations and keeping the entire ocular lens 3 compact in length are enabled by satisfying condition expression (9). If the space between the second lens group G2 and the third lens group G3 is set large, an advantageous effect on aberration correction is produced but the overall length is increased and, therefore, the compactness is lost. For example, in the case of connection to a telescope, the influence of this leads to a disadvantageous state, such as unbalance because the ocular lens part becomes excessively heavy.

In the case of falling beyond the lower limit of condition expression (9), the space between the second lens group G2 and the third lens group G3 is reduced and an intermediate image plane position and the lens surface are brought closer to each other, so that there is a possibility of scratches, dust or the like on the lens surface being seen at the time of viewing. Also, worsening of aberrations results due to an abrupt diffraction effect of the second lens group G2 on a luminous flux at the periphery of the visual field. Therefore falling beyond the lower limit is undesirable. If the lower limit of condition expression (9) is set to 0.8 in order to ensure the effects of the present embodiment, it is possible to provide a more compact ocular lens 3 well corrected for aberrations. Therefore this setting is desirable. In the case of exceeding the upper limit of condition expression (9), the compactness is lost and the weight is increased. Therefore exceeding the upper limit is undesirable. If the upper limit of condition expression (9) is set to 1.5 or further to 1.2 in order to ensure the effects of the present embodiment, it is possible to provide a more compact ocular lens 3 well corrected for aberrations. Therefore this setting is desirable.

It is desirable that, in the ocular lens 3 according to the present embodiment, at least one surface of the lenses included in the lens groups G1 to G3 be aspherical shape. With this arrangement, the degree of freedom with which distortion amount is controlled is markedly increased. Therefore this arrangement is effective in correcting astigmatism at the periphery of the visual field.

A method of changing the viewing magnification by additionally disposing a lens group having a negative refractive power ordinarily on the object side of an ocular lens so that the focal distance of the original ocular lens is reduced is known. In such a case, the additional lens is ordinarily disposed in a state of being incorporated on the main body side of a telescope or the like. According to this method, however, the additional lens is always in the incorporated state and, therefore, there is a need to dismount the additional lens when an ocular lens of a different focal length is used. Therefore this arrangement is inconvenient. Thus, if the additional lens is connected on the ocular lens side, troublesomeness such as described above can be eliminated. Since the additional lens is directly connected to the ocular lens, aberration correction can be performed in a way specialized for the ocular lens. Also, since the additional lens has a negative refractive power, it is also capable of reducing the Petzval sum and can therefore have an advantageous effect on field curvature aberration, astigmatism or the like and enable improving the optical performance. However, the conventional additional lens has a large overall length, for example, and is not compact and, therefore, is difficult to be connected on the ocular lens side. Although an optical system having a one-group two-lens configuration exists, a pupil position in the case of a combination of such an optical system and an additional lens is changed so that a large pupil aberration occurs, resulting in the occurrence of a fault at the time of viewing such as shading of the visual field.

Figure 2:
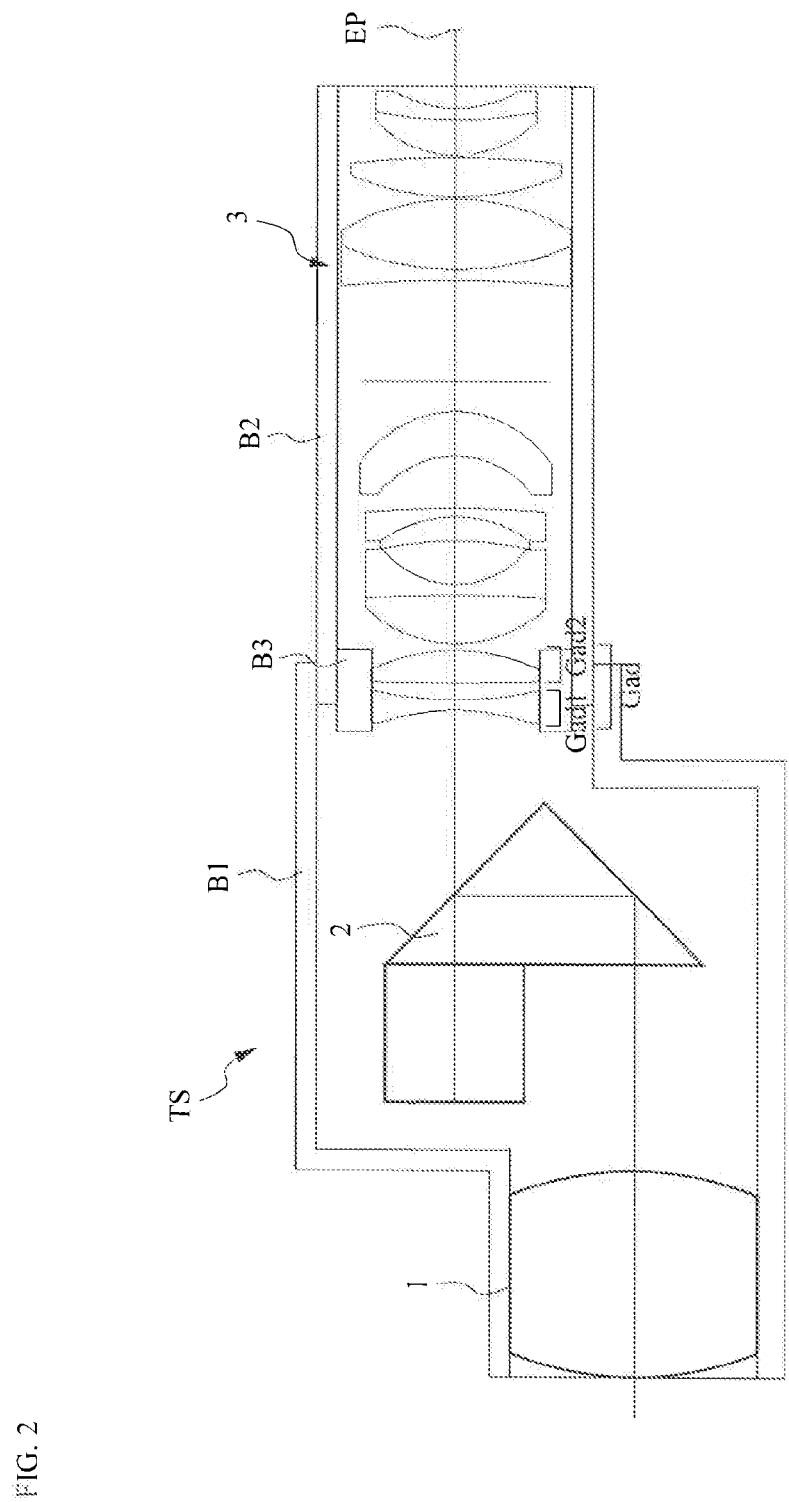
FIG. 2 is an explanatory diagram showing the construction of an optical device having an ocular lens with an additional lens.

An additional lens Gad according to the present embodiment has, as shown in FIG. 2, a two-group configuration formed of a front lens group Gad1 having a negative refractive power and a rear lens group Gad2 having a positive refractive power in order from the object side, and is additionally disposed on the object side of the ocular lens 3. The additional lens Gad is thus constructed to reduce the focal length of the ocular lens 3. In this arrangement, a suitable space is set between the front lens group Gad1 and the rear lens group Gad2 while maintaining the compactness, thereby enabling suppression of variation of the pupil position and, hence, suppression of the occurrence of pupil aberration by the effect of the rear lens group Gad2 having a positive refractive power.

It is desirable that in the additional lens Gad according to the present embodiment, when Dad1 represents an on-axis air space between the front lens group Gad1 and the rear lens group Gad2; Dad2 represents an on-axis air space between the viewing-eye-side outermost lens surface of the rear lens group Gad2 and the object-side outermost lens surface of the ocular lens 3; and f represents the focal length of the ocular lens 3, the following condition expressions (10) and (11) be satisfied.

$$0 < Dad1/f \leq 1 \tag{10}$$

$$0 < Dad2/f \leq 1 \tag{11}$$

Condition expression (10) specifies the on-axis air space between the front lens group Gad1 having a negative refractive power and the rear lens group Gad2 having a positive refractive power in the additional lens Gad. In the case of falling beyond the lower limit of condition expression (10), the lenses, of course, interfere with each other and the pupil position varies largely, so that a pupil aberration occurs. Therefore falling beyond the lower limit is undesirable. In the case of exceeding the upper limit of condition expression (10), this state is advantageous in suppressing the occurrence of pupil aberration but the compactness is lost, which is undesirable for connection to the ocular lens. It is desirable to set the upper limit of condition expression (10) to 0.5 in order to ensure the effects of the present embodiment. It is also desirable to set the upper limit of condition expression (10) to 0.3 in order better to ensure the effects of the present embodiment.

Condition expression (11) specifies the on-axis air space between the viewing-eye-side outermost lens surface of the rear lens group Gad2 having a positive refractive power in the additional lens Gad and the object-side outermost lens surface of the ocular lens 3 to be combined. In the case of falling beyond the lower limit of condition expression (11), the lenses interfere with each other. Therefore falling beyond the lower limit is undesirable. In the case of exceeding the upper limit of condition expression (11), a large pupil aberration occurs. Therefore exceeding the upper limit is undesirable. It is desirable to set the upper limit of condition expression (11) to 0.5 in order to ensure the effects of the present embodiment. It is also desirable to set the upper limit of condition expression (11) to 0.3 in order better to ensure the effects of the present embodiment.

The objective with which the additional lens Gad is provided is to reduce the focal length of the ocular lens 3. However, if the ratio of the focal length after reduction of the ocular lens 3 is excessively high with respect to the original focal length of the ocular lens 3, the occurrence of pupil aberration is increased, which is undesirable. Therefore the additional lens Gad according to the present embodiment is constructed so that while this rate of reduction is limited within a practical range, the compactness is improved and pupil aberration disadvantageous at the time of viewing is reduced. To achieve this, condition expressions (12) and (13) shown below are preferably satisfied. In condition expressions (12) and (13), fad represents the focal length of the additional lens Gad; fad1 represents the focal length of the front lens group Gad1; fad2 represents the focal length of the rear lens group Gad2; and f represents the focal length of the ocular lens 3.

$$10 \leq |fad/f| \tag{12}$$

$$0.6 \leq (-fad1)/fad2 \leq 1.3 \tag{13}$$

Condition expressions (12) and (13) specify the focal length of the additional lens group Gad and the focal lengths of the front lens group Gad1 having a negative refractive power and the rear lens group Gad2 having a positive refractive power.

In the case of falling beyond the lower limit of condition expression (12), the refractive power of the additional lens Gad is increased and the rate of change of the focal length of the ocular lens 3 becomes excessively high, so that a large pupil aberration occurs and shading of the visual field is caused. Therefore falling beyond the lower limit is undesirable. It is desirable to set the lower limit of condition expression (12) to 15 in order to ensure the effects of the present embodiment. It is also desirable to set the lower limit of condition expression (12) to 20 in order better to ensure the effects of the present embodiment.

In the case of falling beyond the lower limit of condition expression (13), the divergence effect of the front lens group Gad1 is made stronger and the pupil aberration is increased. Therefore falling beyond the lower limit is undesirable. It is desirable to set the lower limit of condition expression (13) to 0.7 in order to ensure the effects of the present embodiment. It is also desirable to set the lower limit of condition expression (13) to 0.75 in order better to ensure the effects of the present embodiment. In the case of exceeding the upper limit of condition expression (13), the effect of reducing the focal length of the ocular lens 3 is lost. Therefore exceeding the upper limit is undesirable. It is desirable to set the upper limit of condition expression (13) to 0.99 in order to ensure the effects of the present embodiment. It is also desirable to set the upper limit of condition expression (13) to 0.92 in order better to ensure the effects of the present embodiment.

When the additional lens Gad satisfies such condition expressions (12) and (13), the rate of reduction of the focal length of the ocular lens 3 is about 0.7 to 0.9.

It is desirable that, in the additional lens Gad according to the present embodiment, the front lens group Gad1 consist of a single lens L1 having a concave surface facing the object side, and the rear lens group Gad2 consist of a single lens L2 having a convex surface facing the viewing eye side. It is desirable that, in the additional lens Gad, when Rfad1 represents the radius of curvature of the surface of the front lens group Gad1 on the object side; Rrad1 represents the radius of curvature of the surface of the front lens group Gad1 on the viewing eye side; Rfad2 represents the radius of curvature of the surface of the rear lens group Gad2 on the object side; and Rrad2 represents the radius of curvature of the surface of the rear lens group Gad2 on the viewing eye side, the following condition expressions (14) and (15) be satisfied.

$$0.2 < |Rfad1/Rrad1| \leq 1 \tag{14}$$

$$2 < |Rfad2/Rrad2| \tag{15}$$

Condition expressions (14) and (15) specify the lens shapes of the lens groups Gad1 and Gad2 in the additional lens Gad.

In the case of falling beyond the lower limit of condition expression (14), the divergence effect of the front lens group Gad1 on the surface on the object side is made excessively stronger and worsening of aberrations at the periphery of the visual field results. Therefore falling beyond the lower limit is undesirable. It is desirable to set the lower limit of condition expression (14) to 0.3 in order to ensure the effects of the present embodiment: In the case of exceeding the upper limit of condition expression (14), a large pupil aberration occurs. Therefore exceeding the upper limit is undesirable. It is desirable to set the upper limit of condition expression (14) to 0.8 in order to ensure the effects of the present embodiment.

In the case of falling beyond the lower limit of condition expression (15), a large pupil aberration occurs. Therefore falling beyond the lower limit is undesirable. It is desirable to set the lower limit of condition expression (15) to 4 in order to ensure the effects of the present embodiment. It is also desirable to set the lower limit of condition expression (15) to 5 in order better to ensure the effects of the present embodiment.

It is desirable that, in the additional lens Gad according to the present embodiment, when vad1 represents the d-line Abbe number of the medium of the single lens L1 constituting the front lens group Gad1; and vad2 represents the d-line Abbe number of the medium of the single lens L2 constituting the rear lens group Gad2, the following condition expressions (16) and (17) be satisfied.

$$vad1 - vad2 \leq 25 \tag{16}$$

$$50 < vad1 \tag{17}$$

Condition expressions (16) and (17) specify the Abbe numbers of the mediums constituting the additional lens Gad. In the case of exceeding the upper limit of condition expression (16), the balance of on-axis chromatic aberration in a state where the additional lens Gad is connected is lost. Therefore exceeding the upper limit is undesirable. It is desirable to set the upper limit of condition expression (16) to 20 in order to ensure the effects of the present embodiment. It is also desirable to set the upper limit of condition expression (16) to 15 in order better to ensure the effects of the present embodiment. If condition expression (17) is satisfied simultaneously with this, the occurrence of chromatic aberration in the additional lens Gad can be suppressed. In the case of falling beyond the lower limit of condition expression (17), a large on-axis chromatic aberration occurs. Therefore falling beyond the lower limit is undesirable. It is desirable to set the lower limit of condition expression (17) to 55 in order to ensure the effects of the present embodiment.

As shown in FIG. 2, the additional lens Gad according to the present embodiment is held in a barrel B3 to be detachably attached to a barrel B2 in which the ocular lens 3 is held, thus facilitating attachment to and detachment from the ocular lens 3. In the state where the barrel B3 holding the additional lens Gad is attached to the barrel B2, the barrel B2 holding the ocular lens 3 is attached to an optical device main body B1 holding the objective lens 1 or the like, thus also facilitating attachment and detachment therebetween.

The above-described construction of the ocular lens 3 according to the present embodiment enables the ocular lens 3 to be well corrected for aberrations through a sufficiently large angle of view and to have a sufficient eye relief while ensuring avoidance of increasing the overall length and suppression of an increase in lens diameter. Also, a compact arrangement including the additional lens Gad enables reducing the focal length of the ocular lens 3 while suppressing the occurrence of pupil aberration.

In the above descriptions, the ocular lens 3 according to the present embodiment has been described with respect to the case of use in the telescope optical system TS. However, the ocular lens 3 can also be used in a microscopic optical system or the like. The additional lens Gad according to the present embodiment is not limited to the above-described ocular lens 3; it can also be attached to other ocular lenses.

EXAMPLES

Six examples will be described below with respect to such ocular lenses 3. FIGS. 3, 5, 7, 9, 11, and 13 are diagrams showing the constructions of ocular lenses 3 in the first to sixth examples.

First Example

Figure 3:
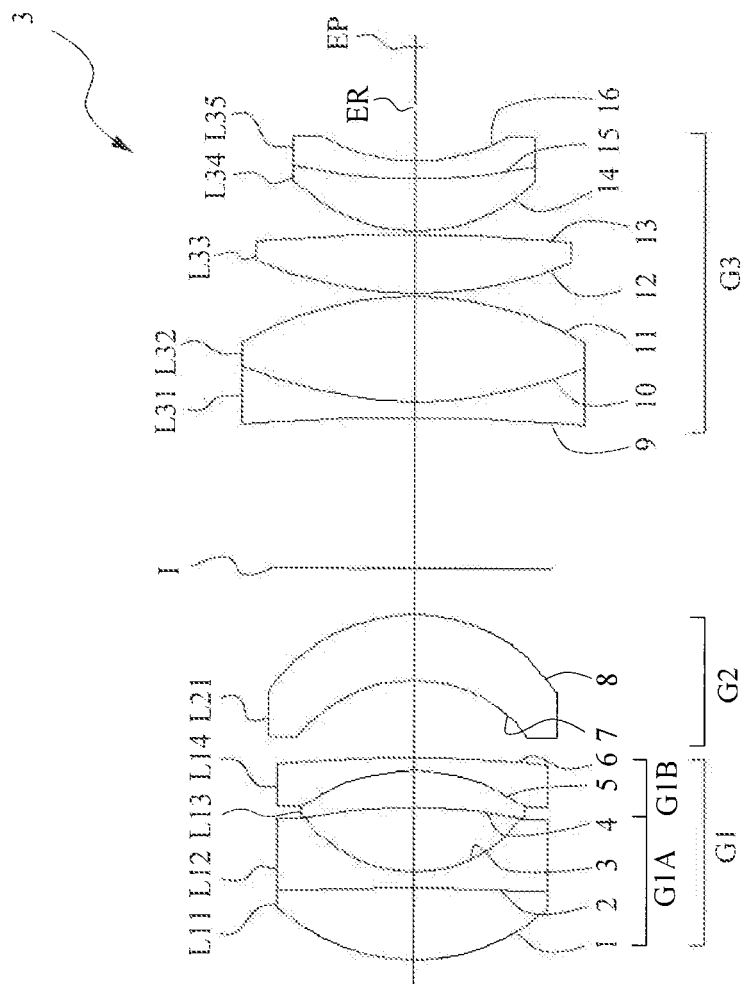
FIG. 3 is a lens configuration diagram of an ocular lens according to a first example.

FIG. 3 shows an ocular lens 3 according to the first example. The ocular lens 3 according to the first example includes, in order from the object side, a first lens group G1 having a negative refractive power, a second lens group G2 having a lens component with a convex surface facing the viewing eye side, and a third lens group G3 having a positive refractive power. An object-side focal plane I of the third lens group G3 is positioned between the second lens group G2 and the third lens group G3. The first lens group G1 includes, in order from the object side, a first lens component G1A in meniscus form having a convex surface facing the object side, and a second lens component G1B.

The first lens component G1A in the first lens group G1 includes a cemented lens formed of a biconvex lens L11 and a biconcave lens L12 in order from the object side. The second lens component G1B includes a cemented lens formed of a positive meniscus lens L13 and a negative meniscus lens L14 in order from the object side, the positive meniscus lens L13 having a convex surface facing the viewing eye side, the negative meniscus lens L14 having a convex surface facing the viewing eye side. The second lens group G2 includes a positive meniscus lens L21 having a convex surface facing the viewing eye side. The third lens group G3 includes, in order from the object side, a cemented lens formed of a biconcave lens L31 and a biconvex lens L32, a biconvex lens L33, and a cemented lens formed of a positive meniscus lens L34 having a convex surface facing the object side and a negative meniscus lens L35 having a convex surface facing the object side.

Table 1 below shows specifications of the ocular lens 3 according to the first example shown in FIG. 3. In Table 1, as listed in the overall specifications, f represents the focal length of the entire system of the ocular lens 3; $2\omega$, the angle of view; and ER, the eye relief (the distance on the optical axis from the lens surface at the outermost end of the ocular lens on the viewing eye side to eye point EP). Also, the first column m of lens data indicates numbers (surface numbers) for the optical surfaces in order from the object side; the second column r, the radii of curvature of the optical surfaces; the third column d, the distances (surface distances) from the respective optical surfaces to the next optical surfaces on the optical axis; the fourth column nd, d-line ($\lambda$=587.6 nm) refractive indices; and the fifth column vd, d-line Abbe numbers. Here, the radius of curvature 0.000 designates a flat plane. The air refractive index 1.000000 is omitted. The surface numbers 1 to 16 shown in Table 1 correspond to the numbers 1 to 16 shown in FIG. 3. Table 1 also shows values corresponding to the above-described condition expressions (1) to (9) with respect to the ocular lens 3.

Here, "mm" is generally used for the units of lengths including the radius of curvature r, the surface distance d, the focal length f and the others shown in the overall specifications described below unless otherwise specified. However, the units are not limited to "mm" and any other suitable units can be used since equivalent optical performance can be obtained in the case of proportional enlargement or proportional reduction of the optical system. The same description as that of the specification table made above will be made for the other examples described below.

TABLE 1

Overall specifications f = 10
$2\omega$ = 82°
ER = 6.0

Lens data

| m | r | d | nd | vd |
|---|---|---|---|---|
| 1 | 11.200 | 3.70 | 1.772500 | 49.615 |
| 2 | −168.100 | 0.85 | 1.723420 | 37.935 |
| 3 | 7.600 | 3.30 | | |
| 4 | −31.000 | 1.90 | 1.805180 | 25.432 |
| 5 | −10.600 | 0.65 | 1.516800 | 64.103 |
| 6 | −80.700 | 4.00 | | |
| 7 | −8.100 | 3.40 | 1.772500 | 49.615 |
| 8 | −9.500 | 10.05 | | |
| 9 | −114.300 | 0.84 | 1.805180 | 25.432 |
| 10 | 24.540 | 5.40 | 1.729160 | 54.660 |
| 11 | −19.400 | 0.17 | | |
| 12 | 23.200 | 3.00 | 1.729160 | 54.660 |
| 13 | −89.100 | 0.18 | | |
| 14 | 9.500 | 2.70 | 1.729160 | 54.660 |
| 15 | 33.600 | 0.90 | 1.761820 | 26.517 |
| 16 | 10.560 | (ER) | | |

Values satisfying the conditions (1) $|f12|/f = 229.3$
(2) $f3/f = 1.06$
(3) $|f2/f| = 121.8$
(4) $Rf/(d11/n11 + d12/n12) = 4.34$
(5) $Rr/f = 0.76$
(6) $f1A/f = -11.1$
(7) $|v11 - v12| = 11.6$
(8) $|v21 - v22| = 38.7$
(9) $D/f = 1.01$ From the above, it can be understood that the ocular lens 3 according to the first example satisfies all the above-described condition expressions (1) to (9).

FIG. 4 shows aberration diagrams showing spherical aberrations and astigmatisms of the ocular lens 3 according to the first example with respect to d-line, F-line and C-line. Here, the spherical aberrations are shown as aberration amounts with respect to the F number FN, and astigmatisms in the astigmatism diagram are shown as aberration amounts with respect to the angle of view $\omega$. Also, in the astigmatism diagram, the solid line indicates sagittal image plane with respect to the wavelength, while the broken line indicates meridional image plane with respect to the wavelength. The same description as that of the aberration diagrams made above will be made for the other examples described below. It can be understood that, as is apparent from the aberration diagrams shown in FIG. 4 and the specification values shown above, the ocular lens 3 according to the first example is well corrected for aberrations through a sufficiently large angle of view, and a sufficient eye relief is provided while avoidance of increasing the overall length and suppression of an increase in lens diameter are ensured.

Second Example

Figure 5:
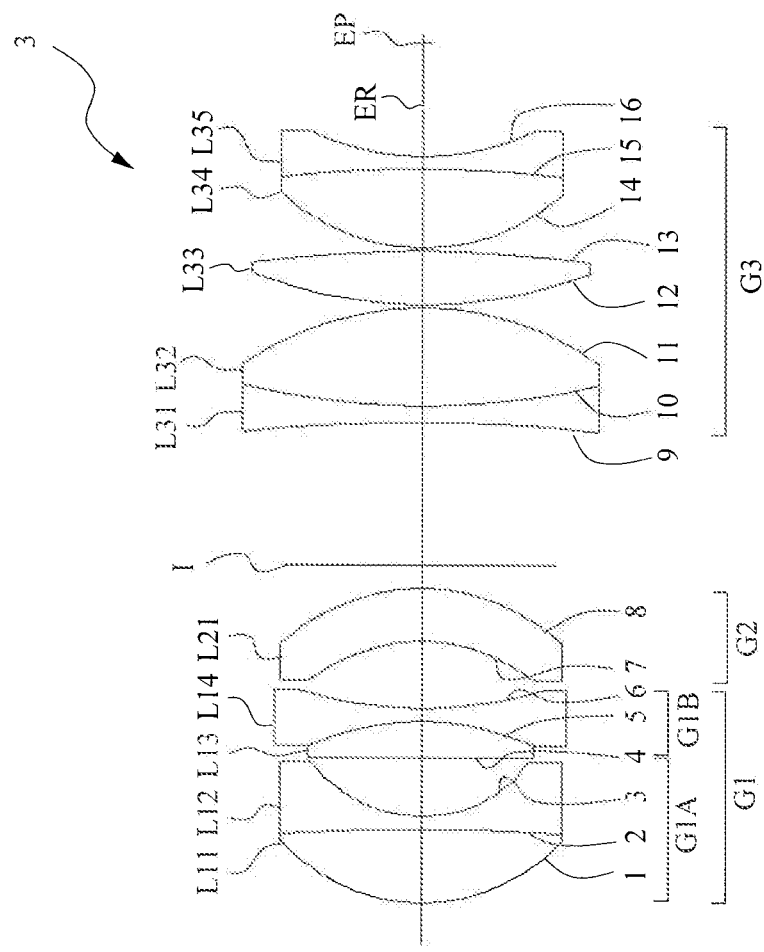
FIG. 5 is a lens configuration diagram of an ocular lens according to a second example.

FIG. 5 shows an ocular lens 3 according to the second example. The ocular lens 3 according to the second example includes, in order from the object side, a first lens group G1 having a negative refractive power, a second lens group G2 having a lens component with a convex surface facing the viewing eye side, and a third lens group G3 having a positive refractive power. An object-side focal plane I of the third lens group G3 is positioned between the second lens group G2 and the third lens group G3. The first lens group G1 includes, in order from the object side, a first lens component G1A in meniscus form having a convex surface facing the object side, and a second lens component G1B.

The first lens component G1A in the first lens group G1 includes a cemented lens formed of a biconvex lens L11 and a biconcave lens L12 in order from the object side. The second lens component G1B includes a cemented lens formed of a planoconvex lens L13 and a biconcave lens L14 in order from the object side, the planoconvex lens L13 having a convex surface facing the viewing eye side. The second lens group G2 includes a negative meniscus lens L21 having a convex surface facing the viewing eye side. The third lens group G3 includes, in order from the object side, a cemented lens formed of a biconcave lens L31 and a biconvex lens L32, a biconvex lens L33, and a cemented lens formed of a biconvex lens L34 and a biconcave lens L35.

Table 2 below shows specifications of the ocular lens 3 according to the second example shown in FIG. 5. The surface numbers 1 to 16 shown in Table 2 correspond to the numbers 1 to 16 shown in FIG. 5.

TABLE 2

Overall specifications f = 10
2ω = 82°
ER = 5.8

Lens data

| m | r | d | nd | vd |
|---|---|---|---|---|
| 1 | 10.520 | 3.70 | 1.755000 | 52.285 |
| 2 | −168.100 | 0.67 | 1.720000 | 43.689 |
| 3 | 7.430 | 3.00 | | |
| 4 | 0.000 | 1.80 | 1.805180 | 25.432 |
| 5 | −15.600 | 0.67 | 1.516800 | 64.103 |
| 6 | 22.500 | 3.40 | | |
| 7 | −10.100 | 2.70 | 1.589130 | 61.088 |
| 8 | −11.330 | 8.40 | | |
| 9 | −93.110 | 0.83 | 1.805180 | 25.432 |
| 10 | 43.700 | 5.00 | 1.729160 | 54.660 |
| 11 | −17.140 | 0.15 | | |
| 12 | 26.900 | 2.70 | 1.729160 | 54.660 |
| 13 | −67.200 | 0.15 | | |
| 14 | 11.645 | 4.00 | 1.729160 | 54.660 |
| 15 | −67.200 | 0.64 | 1.761820 | 26.517 |
| 16 | 14.800 | (ER) | | |

Values satisfying the conditions (1) |f12|/f = 8.8
(2) f3/f = 1.01
(3) |f2/f| = 84.8
(4) Rf/(d11/n11 + d12/n12) = 4.32
(5) Rr/f = 0.74
(6) f1A/f = −13.2
(7) |ν11 − ν12| = 19.0
(8) |ν21 − ν22| = 38.7
(9) D/f = 0.84

Figure 6:
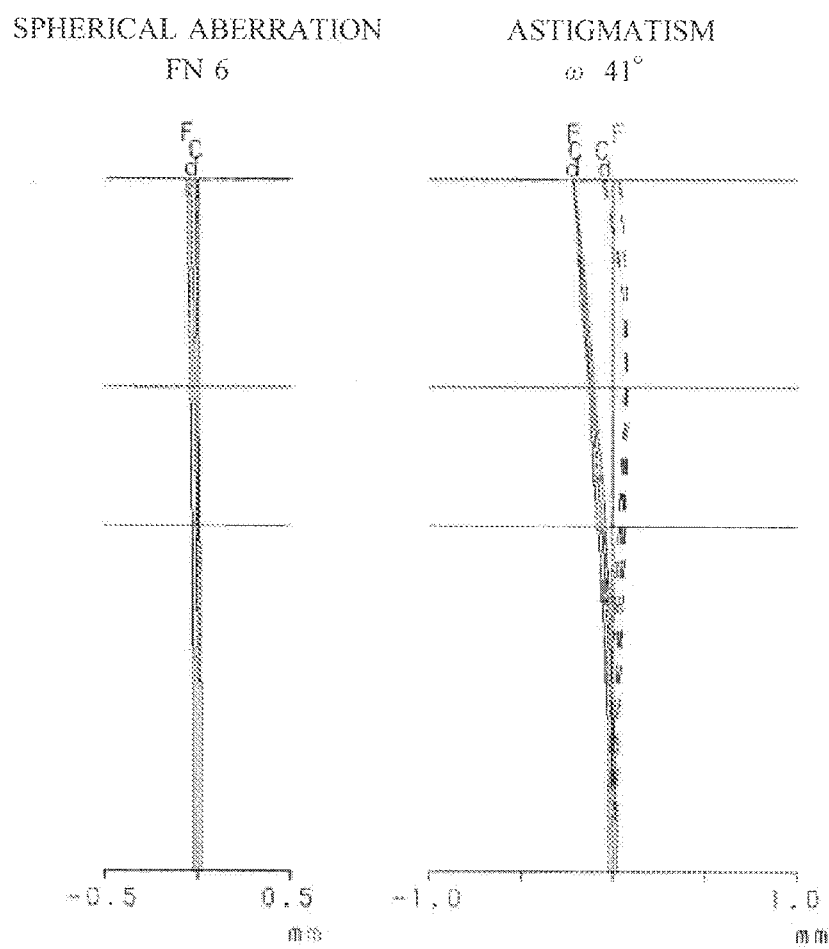
FIG. 6 is a diagram of aberrations in the ocular lens according to the second example.

From the above, it can be understood that the ocular lens 3 according to the second example satisfies all the above-described condition expressions (1) to (9). FIG. 6 shows aberration diagrams showing spherical aberrations and astigmatisms of the ocular lens 3 according to the second example with respect to d-line, F-line and C-line. It can be understood that, as is apparent from the aberration diagrams shown in FIG. 6 and the specification values shown above, the ocular lens 3 according to the second example is well corrected for aberrations through a sufficiently large angle of view, and a sufficient eye relief is provided while avoidance of increasing the overall length and suppression of an increase in lens diameter are ensured.

Third Example

Figure 7:
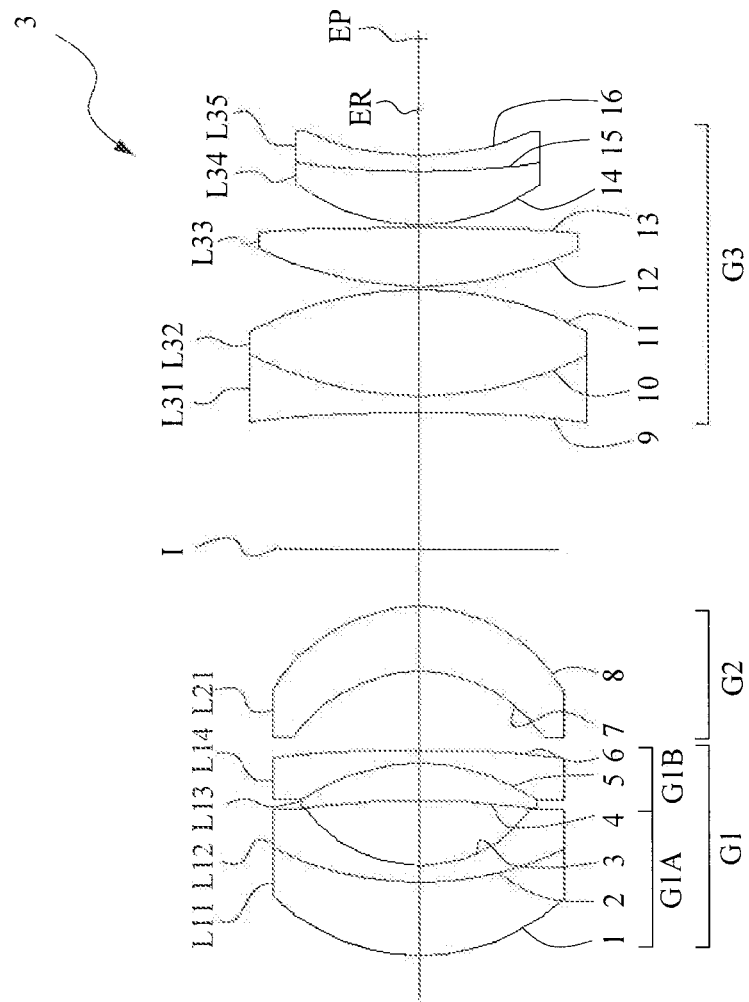
FIG. 7 is a lens configuration diagram of an ocular lens according to a third example.

FIG. 7 shows an ocular lens 3 according to the third example. The ocular lens 3 according to the third example includes, in order from the object side, a first lens group G1 having a negative refractive power, a second lens group G2 having a lens component with a convex surface facing the viewing eye side, and a third lens group G3 having a positive refractive power. An object-side focal plane I of the third lens group G3 is positioned between the second lens group G2 and the third lens group G3. The first lens group G1 includes, in order from the object side, a first lens component G1A in meniscus form having a convex surface facing the object side, and a second lens component G1B.

The first lens component G1A in the first lens group G1 includes a cemented lens formed of a positive meniscus lens L11 and a negative meniscus lens L12 in order from the object side, the positive meniscus lens L11 having a convex surface facing the object side, the negative meniscus lens L12 having a convex surface facing the object side. The second lens component G1B includes a cemented lens formed of a positive meniscus lens L13 and a negative meniscus lens L14 in order from the object side, the positive meniscus lens L13 having a convex surface facing the viewing eye side, the negative meniscus lens L14 having a convex surface facing the viewing eye side. The second lens group G2 includes a positive meniscus lens L21 having a convex surface facing the viewing eye side. The third lens group G3 includes, in order from the object side, a cemented lens formed of a biconcave lens L31 and a biconvex lens L32, a biconvex lens L33, and a cemented lens formed of a positive meniscus lens L34 having a convex surface facing the object side and a negative meniscus lens L35 having a convex surface facing the object side.

Table 3 below shows specifications of the ocular lens 3 according to the third example shown in FIG. 7. The surface numbers 1 to 16 shown in Table 3 correspond to the numbers 1 to 16 shown in FIG. 7.

TABLE 3

Overall specifications f = 10
2ω = 82°
ER = 5.9

Lens data

| m | r | d | nd | vd |
|---|---|---|---|---|
| 1 | 11.770 | 3.70 | 1.804200 | 46.486 |
| 2 | −18.500 | 0.84 | 1.755200 | 27.512 |
| 3 | 7.730 | 3.30 | | |
| 4 | −50.400 | 1.88 | 1.805180 | 25.432 |
| 5 | −11.400 | 0.67 | 1.516800 | 64.103 |
| 6 | −84.700 | 4.00 | | |
| 7 | −8.400 | 3.30 | 1.729160 | 54.660 |
| 8 | −9.200 | 9.80 | | |
| 9 | −80.680 | 0.83 | 1.805180 | 25.432 |
| 10 | 20.200 | 5.40 | 1.729160 | 54.660 |
| 11 | −20.200 | 0.17 | | |

TABLE 3-continued

| 12 | 19.700   | 3.00 | 1.729160 | 54.660 |
|----|----------|------|----------|--------|
| 13 | −145.100 | 0.14 |          |        |
| 14 | 11.200   | 2.70 | 1.729160 | 54.660 |
| 15 | 50.400   | 0.80 | 1.761820 | 26.517 |
| 16 | 15.530   | (ER) |          |        |

Values satisfying the conditions (1) |f12|/f = 20.8
(2) f3/f = 1.05
(3) |f2/f| = 17.9
(4) Rf/(d11/n11 + d12/n12) = 4.53
(5) Rr/f = 0.77
(6) f1A/f = −6.72
(7) |ν11 − ν12| = 8.73
(8) |ν21 − ν22| = 38.7
(9) D/f = 0.98

Figure 8:
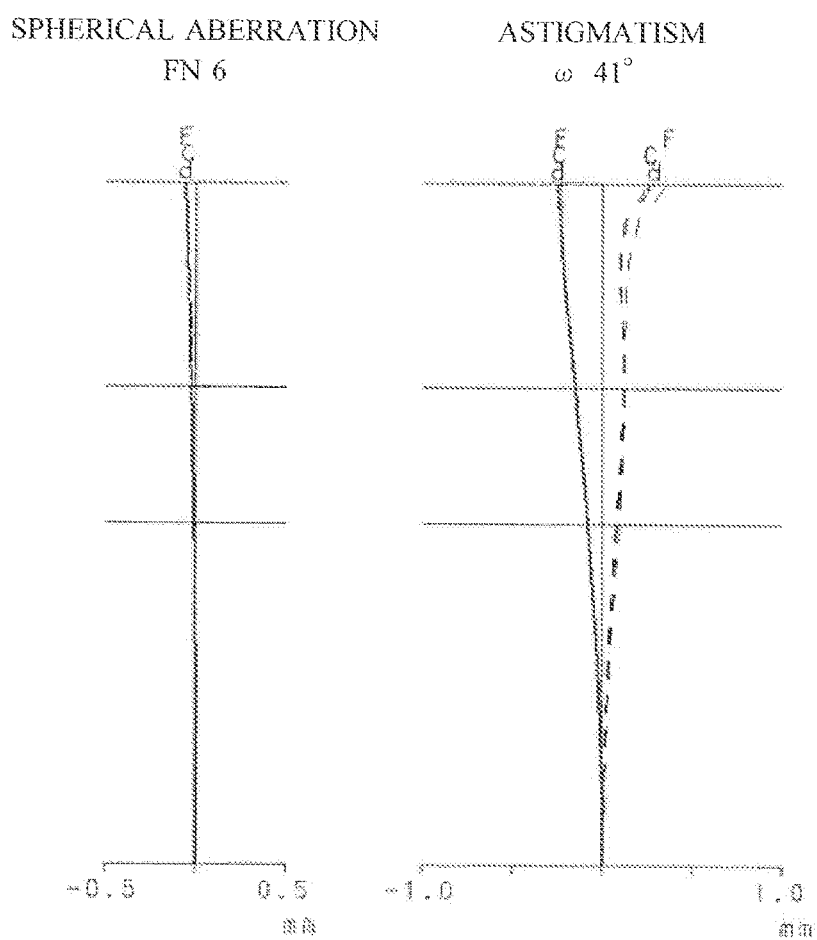
FIG. 8 is a diagram of aberrations in the ocular lens according to the third example.

From the above, it can be understood that the ocular lens 3 according to the third example satisfies all the above-described condition expressions (1) to (9). FIG. 8 shows aberration diagrams showing spherical aberrations and astigmatisms of the ocular lens 3 according to the third example with respect to d-line, F-line and C-line. It can be understood that, as is apparent from the aberration diagrams shown in FIG. 8 and the specification values shown above, the ocular lens 3 according to the third example is well corrected for aberrations through a sufficiently large angle of view, and a sufficient eye relief is provided while avoidance of increasing the overall length and suppression of an increase in lens diameter are ensured.

Fourth Example

Figure 9:
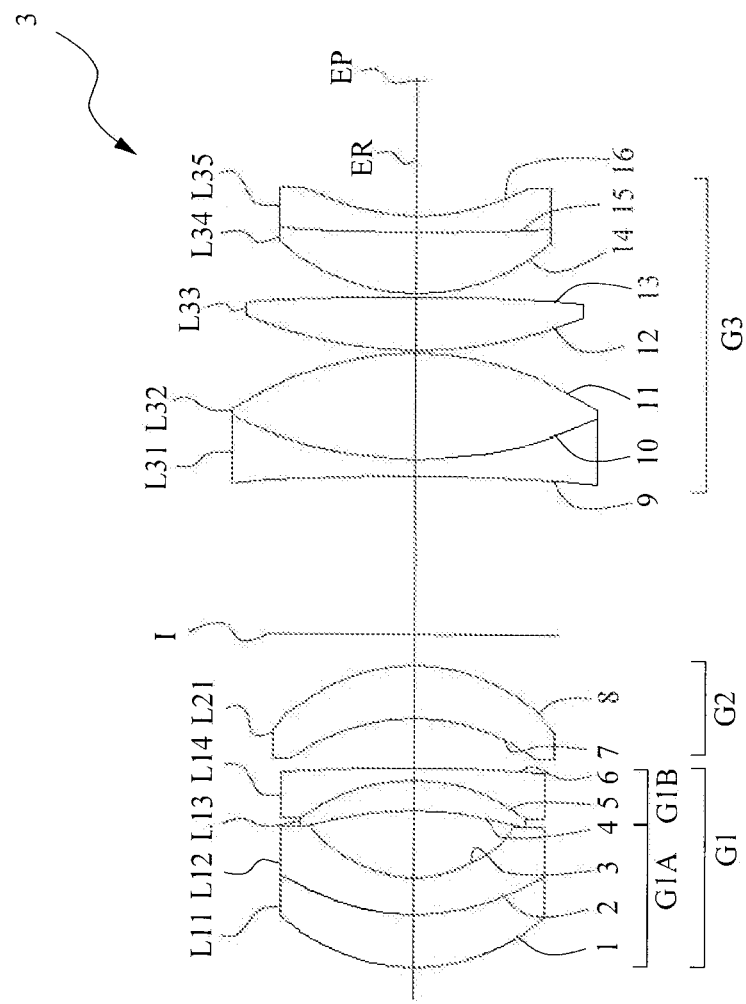
FIG. 9 is a lens configuration diagram of an ocular lens according to a fourth example.

FIG. 9 shows an ocular lens 3 according to the fourth example. The ocular lens 3 according to the fourth example includes, in order from the object side, a first lens group G1 having a negative refractive power, a second lens group G2 having a lens component with a convex surface facing the viewing eye side, and a third lens group G3 having a positive refractive power. An object-side focal plane I of the third lens group G3 is positioned between the second lens group G2 and the third lens group G3. The first lens group G1 includes, in order from the object side, a first lens component G1A in meniscus form having a convex surface facing the object side, and a second lens component G1B.

The first lens component G1A in the first lens group G1 includes a cemented lens formed of a positive meniscus lens L11 and a negative meniscus lens L12 in order from the object side, the positive meniscus lens L11 having a convex surface facing the object side, the negative meniscus lens L12 having a convex surface facing the object side. The second lens component G1B includes a cemented lens formed of a positive meniscus lens L13 and a negative meniscus lens L14 in order from the object side, the positive meniscus lens L13 having a convex surface facing the viewing eye side, the negative meniscus lens L14 having a convex surface facing the viewing eye side. The second lens group G2 includes a positive meniscus lens L21 having a convex surface facing the viewing eye side. The third lens group G3 includes, in order from the object side, a cemented lens formed of a biconcave lens L31 and a biconvex lens L32, a biconvex lens L33, and a cemented lens formed of a positive meniscus lens L34 having a convex surface facing the object side and a negative meniscus lens L35 having a convex surface facing the object side.

Table 4 below shows specifications of the ocular lens 3 according to the fourth example shown in FIG. 9. The surface numbers 1 to 16 shown in Table 4 correspond to the numbers 1 to 16 shown in FIG. 9.

TABLE 4

Overall specifications f = 10
2ω = 82°
ER = 6.9

Lens data

| m | r | d | nd | νd |
|---|---|---|----|----|
| 1  | 10.770   | 2.70 | 1.755000 | 52.285 |
| 2  | 13.370   | 1.84 | 1.755200 | 27.512 |
| 3  | 7.200    | 3.34 |          |        |
| 4  | −21.100  | 1.55 | 1.805180 | 25.432 |
| 5  | −10.200  | 0.63 | 1.497000 | 81.609 |
| 6  | −109.700 | 2.54 |          |        |
| 7  | −11.100  | 2.67 | 1.755000 | 52.285 |
| 8  | −10.200  | 9.63 |          |        |
| 9  | −117.000 | 0.83 | 1.805180 | 25.432 |
| 10 | 23.800   | 5.34 | 1.729160 | 54.660 |
| 11 | −17.800  | 0.16 |          |        |
| 12 | 25.200   | 2.68 | 1.729160 | 54.660 |
| 13 | −133.400 | 0.16 |          |        |
| 14 | 11.230   | 3.13 | 1.729160 | 54.660 |
| 15 | 133.600  | 0.83 | 1.761820 | 26.517 |
| 16 | 13.400   | (ER) |          |        |

Values satisfying the conditions (1) |f12|/f = 47.9
(2) f3/f = 1.10
(3) |f2/f| = 7.32
(4) Rf/(d11/n11 + d12/n12) = 4.16
(5) Rr/f = 0.72
(6) f1A/f = −6.35
(7) |ν11 − ν12| = 24.84
(8) |ν21 − ν22| = 56.2
(9) D/f = 0.96

Figure 10:
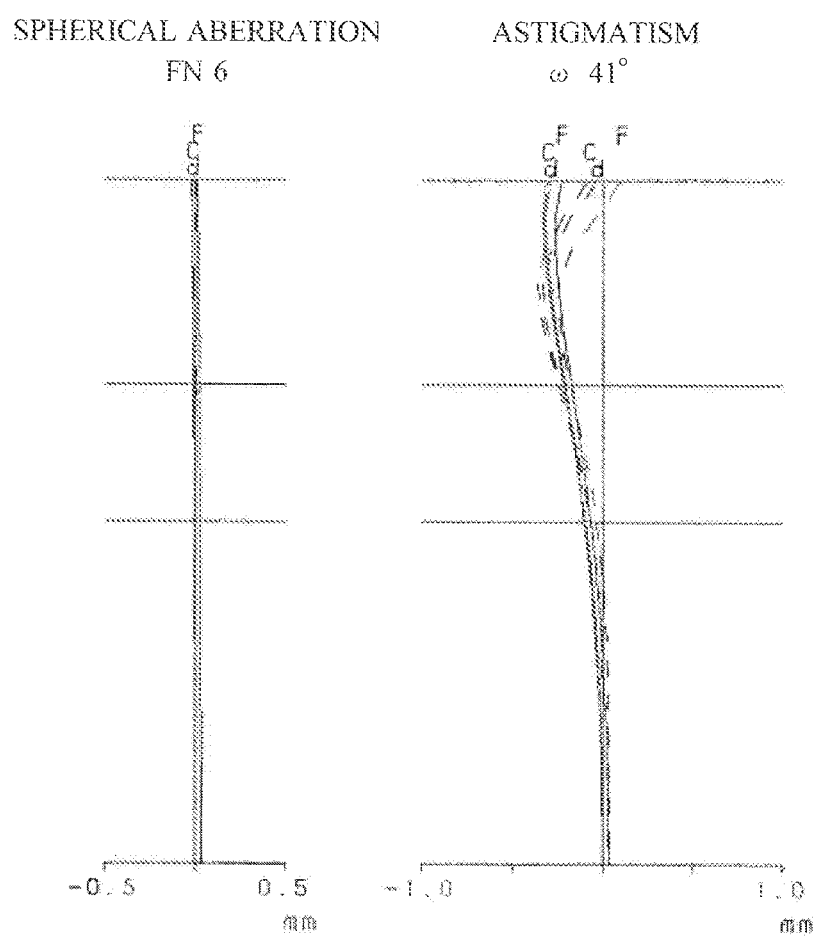
FIG. 10 is a diagram of aberrations in the ocular lens according to the fourth example.

From the above, it can be understood that the ocular lens 3 according to the fourth example satisfies all the above-described condition expressions (1) to (9). FIG. 10 shows aberration diagrams showing spherical aberrations and astigmatisms of the ocular lens 3 according to the fourth example with respect to d-line, F-line and C-line. It can be understood that, as is apparent from the aberration diagrams shown in FIG. 10 and the specification values shown above, the ocular lens 3 according to the fourth example is well corrected for aberrations through a sufficiently large angle of view, and a sufficient eye relief is provided while avoidance of increasing the overall length and suppression of an increase in lens diameter are ensured.

Fifth Example

Figure 11:
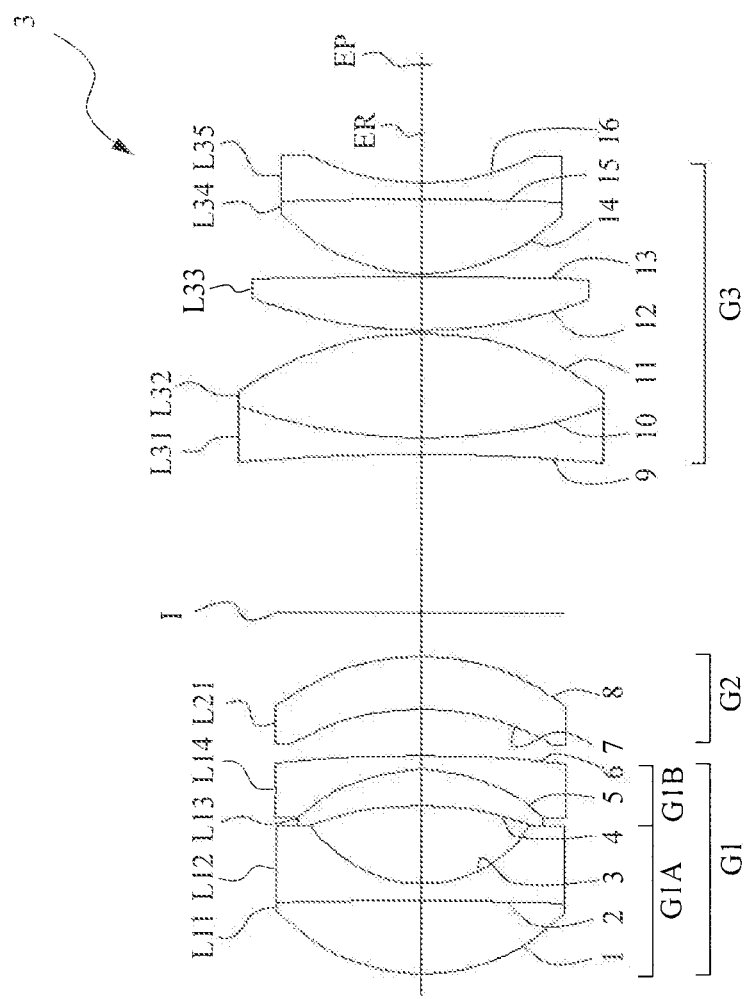
FIG. 11 is a lens configuration diagram of an ocular lens according to a fifth example.

FIG. 11 shows an ocular lens 3 according to the fifth example. The ocular lens 3 according to the fifth example includes, in order from the object side, a first lens group G1 having a negative refractive power, a second lens group G2 having a lens component with a convex surface facing the viewing eye side, and a third lens group G3 having a positive refractive power. An object-side focal plane I of the third lens group G3 is positioned between the second lens group G2 and the third lens group G3. The first lens group G1 includes, in order from the object side, a first lens component G1A in meniscus form having a convex surface facing the object side, and a second lens component G1B.

The first lens component G1A in the first lens group G1 includes a cemented lens formed of a biconvex lens L11 and a biconcave lens L12 in order from the object side. The second lens component G1B includes a cemented lens formed of a positive meniscus lens L13 and a negative meniscus lens L14 in order from the object side, the positive meniscus lens L13 having a convex surface facing the viewing eye side, the negative meniscus lens L14 having a convex surface facing the viewing eye side. The second lens group G2 includes a positive meniscus lens L21 having a convex surface facing the viewing eye side. The third lens group G3 includes, in order from the object side, a cemented lens formed of a biconcave lens L31 and a biconvex lens L32, an aspherical positive lens L33 in biconvex lens form, and a cemented lens formed of a biconvex lens L34 and a biconcave lens L35.

Here, the surface of the aspherical positive lens L33 on the object side is formed into an aspherical shape. This aspherical surface is expressed by expression (a) shown below, in which y represents a height in a direction perpendicular to the optical axis; S(y), the distance (sag amount) along the optical axis from a tangent plane at the vertex of each aspherical surface to the aspherical surface at the height y; r, the radius of curvature of a reference spherical surface (the radius of paraxial curvature); κ, a conical constant; and An, an nth-order aspherical constant, $$S(y) = (y^2/r)/\{1 + (1 - \kappa \times y^2/r^2)^{1/2}\} + A4 \times y^4 + A6 \times y^6 + A8 \times y^8 + A10 \times y^{10} \quad (a)$$

Table 5 below shows specifications of the ocular lens 3 according to the fifth example shown in FIG. 11. In the lens data, * is shown on the right-hand side of the surface number for the surface formed into the aspherical shape. With respect to this aspherical surface, the values of the conical constant κ and the aspherical constant An in the above aspherical surface expression (a) are shown in Table 5. In the aspherical constant An, "E-n" represents "×10⁻ⁿ". The surface numbers 1 to 16 shown in Table 5 correspond to the numbers 1 to 16 shown in FIG. 11.

TABLE 5

Overall specifications f = 10
2ω = 82°
ER = 6.0

Lens data

| m | r | d | nd | vd |
|---|---|---|---|---|
| 1 | 10.890 | 3.73 | 1.755000 | 52.285 |
| 2 | −168.100 | 0.84 | 1.720000 | 43.689 |
| 3 | 7.340 | 3.95 | | |
| 4 | −17.950 | 1.82 | 1.805180 | 25.432 |
| 5 | −9.950 | 0.69 | 1.516800 | 64.103 |
| 6 | −79.700 | 2.36 | | |
| 7 | −14.800 | 2.71 | 1.589130 | 61.088 |
| 8 | −12.880 | 10.23 | | |
| 9 | −117.650 | 0.83 | 1.805180 | 25.432 |
| 10 | 31.250 | 5.30 | 1.729160 | 54.660 |
| 11 | −17.580 | 0.14 | | |
| 12* | 25.410 | 2.72 | 1.729160 | 54.660 |
| 13 | −302.500 | 0.16 | | |
| 14 | 10.910 | 3.74 | 1.729160 | 54.660 |
| 15 | −238.300 | 0.82 | 1.761820 | 26.517 |
| 16 | 13.450 | (ER) | | |

Aspherical surface data

| | κ | A4 | A6 | A8 | A10 |
|---|---|---|---|---|---|
| 12th surface | 0.0000 | 0.00E+00 | 0.51E−07 | 0.00E+00 | 0.00E+00 |

Values satisfying the conditions (1) |f12|/f = 14.3
(2) f3/f = 1.07
(3) |f2/f| = 11.06

TABLE 5-continued (4) Rf/(d11/n11 + d12/n12) = 4.17
(5) Rr/f = 0.73
(6) f1A/f = −9.26
(7) |ν11 − ν12| = 8.76
(8) |ν21 − ν22| = 38.7
(9) D/f = 1.02

Figure 12:
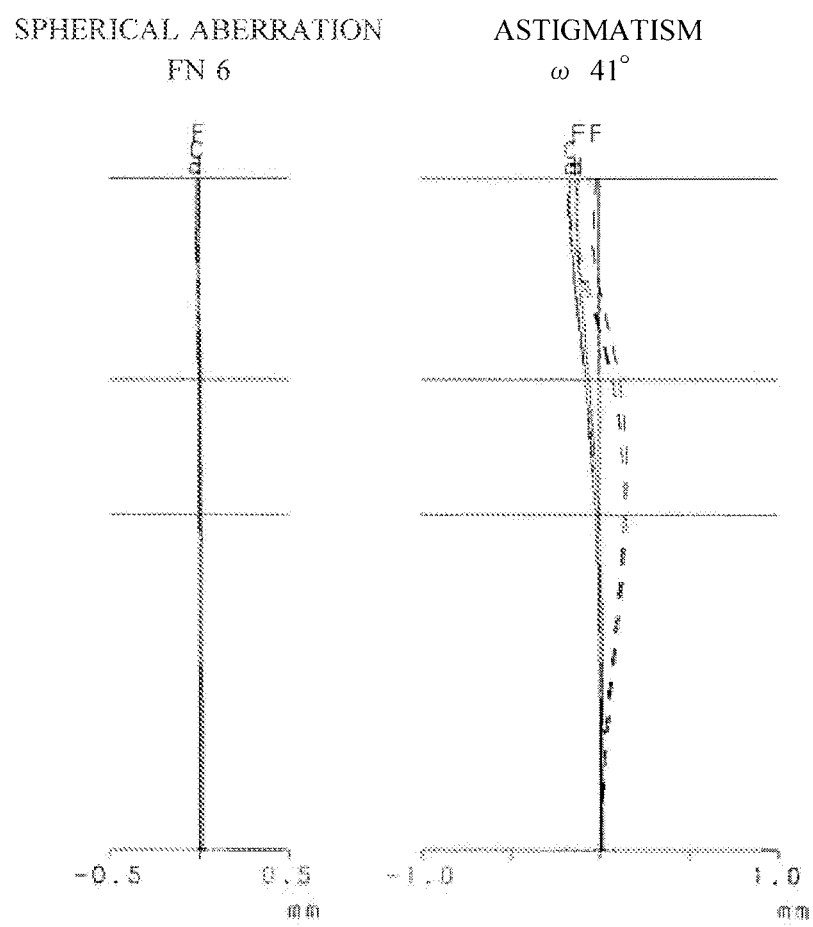
FIG. 12 is a diagram of aberrations in the ocular lens according to the fifth example.

From the above, it can be understood that the ocular lens 3 according to the fifth example satisfies all the above-described condition expressions (1) to (9). FIG. 12 shows aberration diagrams showing spherical aberrations and astigmatisms of the ocular lens 3 according to the fifth example with respect to d-line, F-line and C-line. It can be understood that, as is apparent from the aberration diagrams shown in FIG. 12 and the specification values shown above, the ocular lens 3 according to the fifth example is well corrected for aberrations through a sufficiently large angle of view, and a sufficient eye relief is provided while avoidance of increasing the overall length and suppression of an increase in lens diameter are ensured.

Sixth Example

Figure 13:
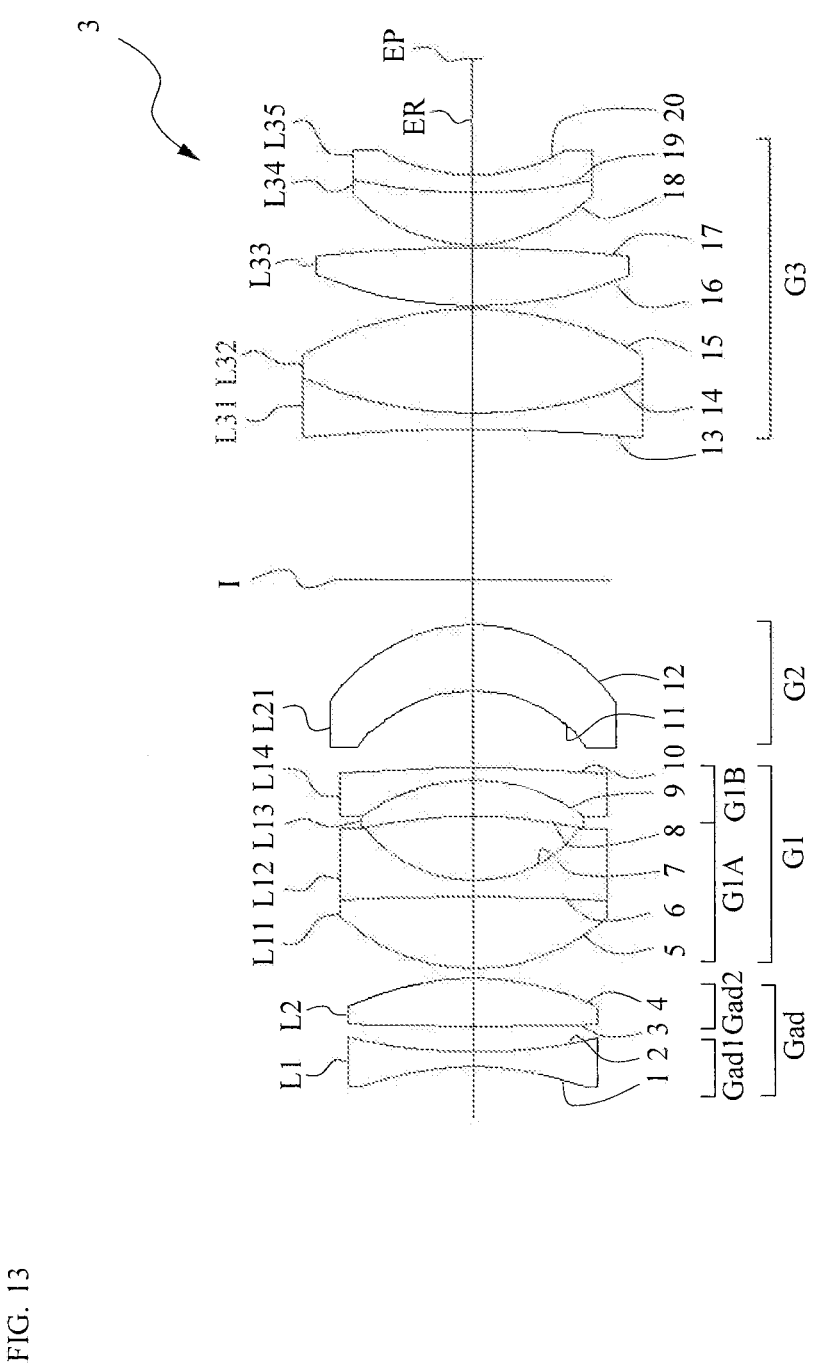
FIG. 13 is a lens configuration diagram of an ocular lens according to a sixth example.

The sixth example has a construction in which, as shown FIG. 13, an additional lens Gad is disposed on the object side of the ocular lens 3 shown in the first example. Here, the additional lens Gad includes, in order from the object side, a front lens group Gad1 having a negative refractive power, and a rear lens group Gad2 having a positive refractive power. The front lens group Gad1 consists of a biconcave lens L1, and the rear lens group Gad2 consists of a biconvex lens L2.

Table 6 below shows specifications of the ocular lens 3 according to the sixth example shown in FIG. 13. In Table 6, fad represents the focal length of the additional lens Gad, and fall represents the combined focal length of the additional lens Gad and the ocular lens 3. The surface numbers 1 to 20 shown in Table 6 correspond to the numbers 1 to 20 shown in FIG. 13.

TABLE 6

Overall specifications f = 10
2ω = 82°
ER = 6.0
fad = −445.1
fall = 8.43

Lens data

| m | r | d | nd | vd |
|---|---|---|---|---|
| 1 | −17.520 | 0.77 | 1.516800 | 63.881 |
| 2 | 32.000 | 1.30 | | |
| 3 | 203.200 | 2.50 | 1.568830 | 55.987 |
| 4 | −16.000 | 0.50 | | |
| 5 | 11.200 | 3.70 | 1.772500 | 49.615 |
| 6 | −168.100 | 0.85 | 1.723420 | 37.935 |
| 7 | 7.600 | 3.30 | | |
| 8 | −31.000 | 1.90 | 1.805180 | 25.432 |
| 9 | −10.600 | 0.65 | 1.516800 | 64.103 |
| 10 | −80.700 | 4.00 | | |
| 11 | −8.100 | 3.40 | 1.772500 | 49.615 |
| 12 | −9.500 | 10.05 | | |
| 13 | −114.300 | 0.84 | 1.805180 | 25.432 |
| 14 | 24.540 | 5.40 | 1.729160 | 54.660 |
| 15 | −19.400 | 0.17 | | |
| 16 | 23.200 | 3.00 | 1.729160 | 54.660 |
| 17 | −89.100 | 0.18 | | |
| 18 | 9.500 | 2.70 | 1.729160 | 54.660 |

TABLE 6-continued

| 19 | 33.600 | 0.90 | 1.761820 | 26.517 |
|----|--------|------|----------|--------|
| 20 | 10.560 | (ER) |          |        |

Values satisfying the conditions (1) |f12|/f = 229.3
(2) f3/f = 1.06
(3) |f2/f| = 121.8
(4) Rf/(d11/n11 + d12/n12) = 4.34
(5) Rr/f = 0.76
(6) f1A/f = −11.1
(7) |ν11 − ν12| = 11.6
(8) |ν21 − ν22| = 38.7
(9) D/f = 1.01
(10) Dad1/f = 0.13
(11) Dad2/f = 0.05
(12) |fad/f| = 44.51
(13) (−fad1)/fad2 = 0.83
(14) |Rfad1/Rrad1| = 0.55
(15) |Rfad2/Rrad2| = 12.70
(16) νad1 − νad2 = 7.88
(17) νad1 = 63.881

Figure 14:
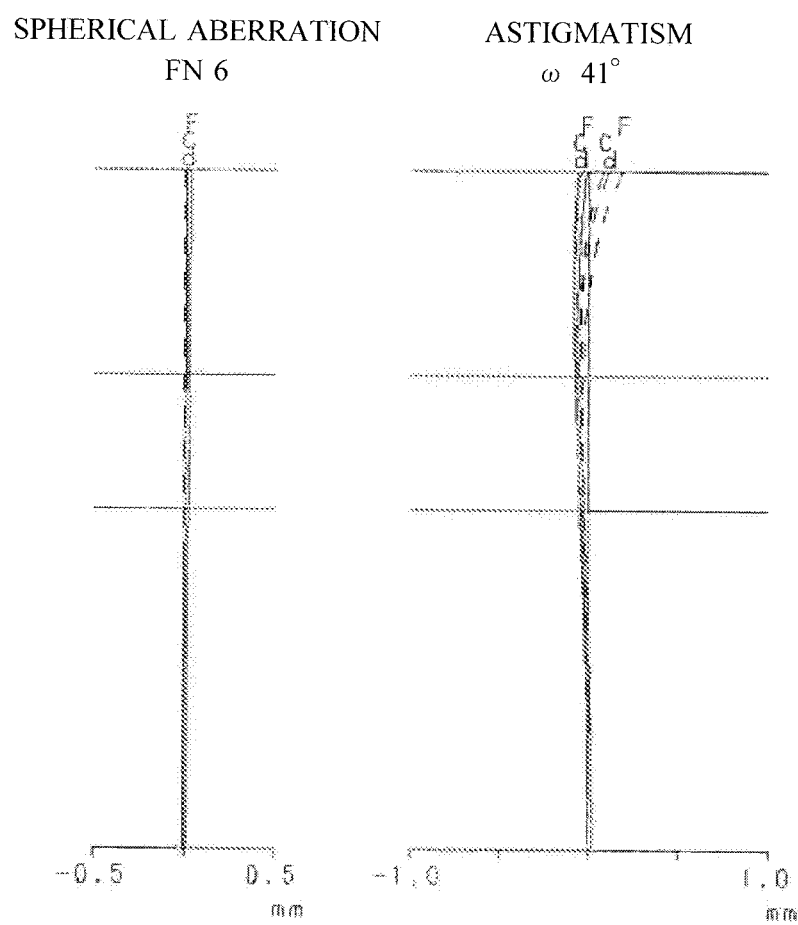
FIG. 14 is a diagram of aberrations in the ocular lens according to the sixth example.

From the above, it can be understood that the ocular lens 3 according to the sixth example satisfies all the above-described condition expressions (1) to (9), and that the additional lens Gad satisfies all the above-described condition expressions (10) to (17). FIG. 14 shows aberration diagrams showing spherical aberrations and astigmatisms of the ocular lens 3 with the additional lens Gad according to the sixth example with respect to d-line, F-line and C-line. It can be understood that, as is apparent from the aberration diagrams shown in FIG. 14 and the specification values shown above, the ocular lens 3 with the additional lens Gad according to the sixth example is well corrected for aberrations through a sufficiently large angle of view, and a sufficient eye relief is provided while avoidance of increasing the overall length and suppression of an increase in lens diameter are ensured.

REFERENCE SIGNS LIST

TS Telescope optical system
3 Ocular lens
B2 Barrel
G1 First lens group
G1A First lens component
G1B Second lens component
G2 Second lens group
G3 Third lens group
Gad Additional lens
Gad1 Front lens group
Gad2 Rear lens group

The invention claimed is:

1. An ocular lens comprising in order from an object side:
a first lens group including a first lens component in meniscus form having a convex surface facing the object side;
a second lens group including a lens component having a convex surface facing a viewing eye side; and
a third lens group having a positive refractive power,
wherein an object-side focal plane of the third lens group is positioned between the second lens group and the third lens group, and
wherein when f represents the focal length of the entire system; and f12 represents the combined focal length of the first lens group and the second lens group, a condition shown by the following expression:

$$6 \leq |f12|/f$$

is satisfied.

2. The ocular lens according to claim 1, wherein when f3 represents the focal length of the third lens group, a condition shown by the following expression:

$$0.7 \leq f3/f \leq 1.5$$

is satisfied.

3. The ocular lens according to claim 1, wherein when f2 represents the focal length of the second lens group, a condition shown by the following expression:

$$5 \leq |f2/f|$$

is satisfied.

4. The ocular lens according to claim 1, wherein the first lens component included in the first lens group is a cemented lens formed by cementing two lenses to each other, and, when Rf represents the radius of curvature of the surface of the first lens component on the object side; d11 represents the on-axis distance of the lens on the object side; n11 represents the d-line refractive index of the medium of the lens on the object side; d12 represents the on-axis distance of the lens on the viewing eye side; and n12 represents the d-line refractive index of the medium of the lens on the viewing eye side, a condition shown by the following expression:

$$2 \leq Rf/(d11/n11 + d12/n12) \leq 5.5$$

is satisfied.

5. The ocular lens according to claim 1, wherein when Rr represents the radius of curvature of the surface on the viewing eye side of the first lens component included in the first lens group, a condition shown by the following expression:

$$0.55 \leq Rr/f \leq 1.1$$

is satisfied.

6. The ocular lens according to claim 1, wherein the first lens component included in the first lens group has a negative refractive power and, when f1A represents the focal length of the first lens component, a condition shown by the following expression:

$$f1A/f \leq -3$$

is satisfied.

7. The ocular lens according to claim 1, wherein the first lens component included in the first lens group is a cemented lens formed by cementing two lenses to each other, and, when ν11 represents the d-line Abbe number of the medium of the lens on the object side in the first lens component; and ν12 represents the d-line Abbe number of the medium of the lens on the viewing eye side, a condition shown by the following expression:

$$3 \leq |\nu11 - \nu12| \leq 40$$

is satisfied.

8. The ocular lens according to claim 1, wherein when D represents an on-axis air space between the second lens group and the third lens group, a condition shown by the following expression:

$$0.7 \leq D/f \leq 2$$

is satisfied.

9. The ocular lens according to claim 1, wherein the second lens group includes a lens component in meniscus lens form having a convex surface facing the viewing eye side.

10. An optical device comprising the ocular lens according to claim 1.

11. The ocular lens according to claim 1, wherein the first lens group includes, in order from the object side, the first lens component and a second lens component.

12. The ocular lens according to claim 11, wherein the second lens component included in the first lens group is a cemented lens formed by cementing two lenses to each other, and, when ν21 represents the d-line Abbe number of the medium of the lens on the object side in the second lens component; and ν22 represents the d-line Abbe number of the medium of the lens on the viewing eye side, a condition shown by the following expression:

$$20 \le |\nu 21 - \nu 22|$$

is satisfied.

13. An ocular lens with an additional lens comprising:
the ocular lens according to claim 1; and
an additional lens including, in order from an object side, a front lens group having a negative refractive power and a rear lens group having a positive refractive power, the additional lens being additionally disposed on the object side of the ocular lens to reduce the focal length of the ocular lens,
wherein when Dad1 represents an on-axis air space between the front lens group and the rear lens group; Dad2 represents an on-axis air space between the viewing-eye-side outermost lens surface of the rear lens group and the object-side outermost lens surface of the ocular lens; and f represents the focal length of the ocular lens, conditions shown by the following expressions:

$$0 < Dad1/f \le 1$$

$$0 < Dad2/f \le 1$$

are satisfied.

14. The ocular lens with an additional lens according to claim 13, wherein when fad represents the focal length of the additional lens; fad1 represents the focal length of the front lens group; and fad2 represents the focal length of the rear lens group, conditions shown by the following expressions:

$$10 \le |fad/f|$$

$$0.6 \le (-fad1)/fad2 \le 1.3$$

are satisfied.

15. The ocular lens with an additional lens according to claim 13, wherein the additional lens can be mounted in a barrel that holds the ocular lens.

16. An optical device comprising the ocular lens with an additional lens according to claim 13.

17. The ocular lens with an additional lens according to claim 13, wherein the front lens group consists of a single lens having a concave surface facing the object side,
wherein the rear lens group consists of a single lens having a convex surface facing the viewing eye side, and
wherein, when Rfad1 represents the radius of curvature of the surface of the front lens group on the object side; Rrad1 represents the radius of curvature of the surface of the front lens group on the viewing eye side; Rfad2 represents the radius of curvature of the surface of the rear lens group on the object side; and Rrad2 represents the radius of curvature of the surface of the rear lens group on the viewing eye side, conditions shown by the following expressions:

$$0.2 < |Rfad1/Rrad1| \le 1$$

$$2 < |Rfad2/Rrad2|$$

are satisfied.

18. The ocular lens with an additional lens according to claim 17, wherein when νad1 represents the d-line Abbe number of the medium of the single lens constituting the front lens group; and νad2 represents the d-line Abbe number of the medium of the single lens constituting the rear lens group, conditions shown by the following expressions:

$$\nu ad1 - \nu ad2 \le 25$$

$$50 < \nu ad1$$

are satisfied.

\* \* \* \* \*